US012334649B2

(12) United States Patent
Desclos et al.

(10) Patent No.: US 12,334,649 B2
(45) Date of Patent: Jun. 17, 2025

(54) RECONFIGURABLE MULTI-MODE ACTIVE ANTENNA SYSTEM

(71) Applicant: Kyocera AVX Components (San Diego), Inc., San Diego, CA (US)

(72) Inventors: Laurent Desclos, San Diego, CA (US); Chun-Su Yoon, Gyeonggi-do (KR)

(73) Assignee: Kyocera AVX Components (San Diego), Inc., San Diego, CA (US)

(*) Notice: Subject to any disclaimer, the term of this patent is extended or adjusted under 35 U.S.C. 154(b) by 526 days.

(21) Appl. No.: 17/666,145

(22) Filed: Feb. 7, 2022

(65) Prior Publication Data

US 2022/0231418 A1 Jul. 21, 2022

Related U.S. Application Data

(63) Continuation of application No. 16/439,846, filed on Jun. 13, 2019, now Pat. No. 11,245,189, which is a continuation of application No. 14/781,889, filed as application No. PCT/US2014/031151 on Mar. 19, 2014, now Pat. No. 10,355,358.

(Continued)

(51) Int. Cl.

| | |
|---|---|
| ***H01Q 5/378*** | (2015.01) |
| ***H01Q 5/328*** | (2015.01) |
| ***H01Q 5/335*** | (2015.01) |
| ***H01Q 5/357*** | (2015.01) |
| ***H01Q 5/364*** | (2015.01) |

(Continued)

(52) U.S. Cl.

CPC ............. *H01Q 5/364* (2015.01); *H01Q 5/328* (2015.01); *H01Q 5/335* (2015.01); *H01Q 5/357* (2015.01); *H01Q 5/378* (2015.01); *H01Q 5/392* (2015.01); *H01Q 5/50* (2015.01)

(58) Field of Classification Search

CPC ............... H01Q 1/243; H01Q 5/30–50; H01Q 5/378–392

See application file for complete search history.

(56) References Cited

U.S. PATENT DOCUMENTS

| | | | |
|---|---|---|---|
| 6,232,920 | B1 | 5/2001 | Brookner et al. |
| 6,765,536 | B2 | 7/2004 | Phillips |

(Continued)

FOREIGN PATENT DOCUMENTS

| | | |
|---|---|---|
| EP | 0923158 | 6/1999 |

OTHER PUBLICATIONS

PCT International Search Report and Written Opinion for corresponding PCT Application No. PCT/US2014/031151, mailed on Nov. 13, 2014, 8 pages.

*Primary Examiner* — Hasan Islam

(74) *Attorney, Agent, or Firm* — Dority & Manning, P.A.

(57) ABSTRACT

A reconfigurable antenna system is described which combines active and passive components used to impedance match, alter the frequency response, and change the radiation pattern of an antenna. Re-use of components such as switches and tunable capacitors make the circuit topologies more space and cost effective, while reducing complexity of the control signaling required. Antenna structures with single and multiple feed and/or ground connections are described and active circuit topologies are shown for these configurations. A processor and algorithm can reside with the antenna circuitry, or the algorithm to control antenna optimization can be implemented in a processor in the host device.

13 Claims, 26 Drawing Sheets

Related U.S. Application Data

(60) Provisional application No. 61/806,939, filed on Apr. 1, 2013.

(51) Int. Cl.
*H01Q 5/392* (2015.01)
*H01Q 5/50* (2015.01)

(56) References Cited

U.S. PATENT DOCUMENTS

| | | | | |
|---|---|---|---|---|
| 7,372,406 | B2 * | 5/2008 | Shiotsu | H01Q 1/2266 343/700 MS |
| 7,420,511 | B2 | 9/2008 | Oshiyama | |
| 7,656,364 | B2 | 2/2010 | Masini | |
| 9,608,331 | B1 | 3/2017 | Rowson | |
| 2003/0146872 | A1 | 8/2003 | Kellerman | |
| 2006/0097918 | A1 | 5/2006 | Oshiyama | |
| 2009/0046028 | A1 | 2/2009 | Han | |
| 2009/0051611 | A1 | 2/2009 | Shamblin | |
| 2009/0128428 | A1 | 5/2009 | Ishizuka | |
| 2009/0224991 | A1 | 9/2009 | Rowson | |
| 2010/0060531 | A1 | 3/2010 | Rappaport | |
| 2011/0032165 | A1 | 2/2011 | Heng et al. | |
| 2012/0039320 | A1 | 2/2012 | Lemson et al. | |
| 2012/0146865 | A1 | 6/2012 | Hayashi | |
| 2012/0274538 | A1 | 11/2012 | Tsou | |
| 2012/0280871 | A1 * | 11/2012 | Shamblin | H01Q 5/392 343/745 |
| 2014/0292587 | A1 * | 10/2014 | Yarga | H01Q 1/243 343/702 |
| 2015/0222020 | A1 | 8/2015 | Tai | |
| 2016/0056545 | A1 | 2/2016 | Park | |
| 2016/0254590 | A1 | 9/2016 | Seo et al. | |

* cited by examiner

Active Matched Antenna
Active matching circuit dynamically matches antenna 4 antennas configured to operate with a common tunable capacitor Two antenna configuration utilizing a single tunable capacitor and coupled to a common transceiver port Two loop antenna configuration utilizing a single tunable capacitor and coupled to a common transceiver port

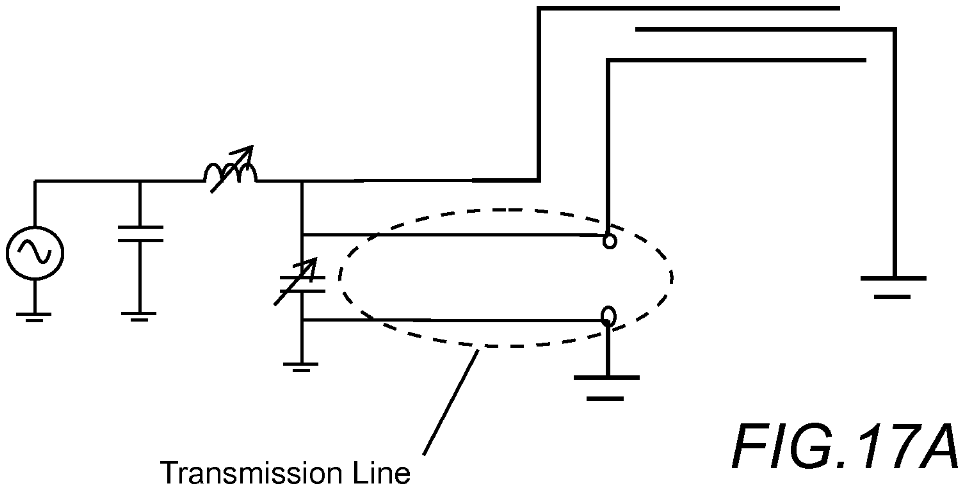
FIG.17A
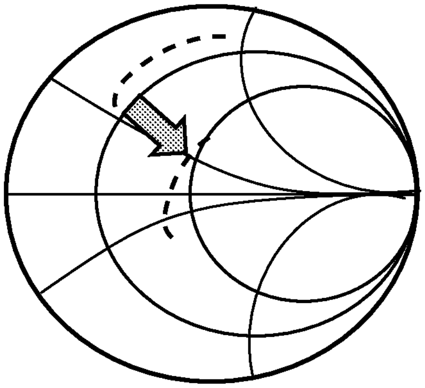
FIG.17B
FIG.17C
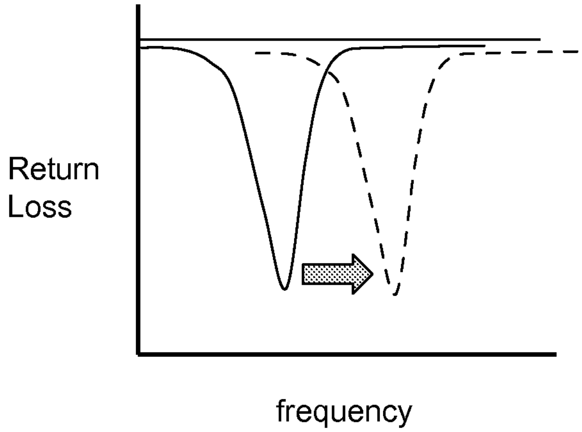

RECONFIGURABLE MULTI-MODE ACTIVE ANTENNA SYSTEM

PRIORITY CLAIM

The present application is a continuation of U.S. patent application Ser. No. 16/439,846, titled "Reconfigurable Multi-Mode Active Antenna System," filed on Jun. 13, 2019, which is a continuation of U.S. patent application Ser. No. 14/781,889, now U.S. Pat. No. 10,355,358, titled "Reconfigurable Multi-Mode Active Antenna System," filed on Oct. 1, 2015, which is a 371 of International Application No. PCT/US2014/031151, titled "Reconfigurable Multi-Mode Active Antenna System," filed on Mar. 19, 2014, which claims the benefit of priority of U.S. Provisional Patent Application Ser. No. 61/806,939 filed on Apr. 1, 2013, which is incorporated herein in its entirety by reference.

TECHNICAL FIELD

This invention relates generally to the field of wireless communications; and more particularly, to an active antenna system including an active antenna associated with an antenna tuning module, the active antenna system being adapted to provide robust multi-band operation.

BACKGROUND ART

Current and future communication systems will require antenna systems capable of operation over multiple frequency bands. Efficiency improvements in the antenna system will be needed to provide better overall communication system performance, for example, increased antenna efficiency will translate into greater battery life in a mobile wireless device. For Multiple Input Multiple Output (MIMO) applications, isolation between multiple antennas as well as de-correlated radiation patterns will need to be maintained across multiple frequency bands. Closed loop active impedance matching circuits integrated into the antenna will enable capability to dynamically impedance match the antenna for a wide variety of use conditions, such as the handset against the user's head for example. These and other requirements continue to drive a need for dynamic tuning solutions, such as active frequency shifting, active beam steering, and active impedance matching, such that antenna characteristics may be dynamically altered for improving antenna performance.

Commonly owned U.S. Pat. No. 7,911,402, issued Mar. 22, 2011, and titled "ANTENNA AND METHOD FOR STEERING ANTENNA BEAM DIRECTION", describes a beam steering technique wherein a single antenna is capable of generating multiple radiating modes. In sum, this beam steering technique is effectuated with the use of a driven antenna and one or more offset parasitic elements that alter the current distribution on the driven antenna as the reactive load on the parasitic is varied. Multiple modes are generated, and thus this technique can be referred to as a "modal antenna technique", and an antenna configured to alter radiating modes in this fashion can be referred to as an "active multimode antenna" or "active modal antenna".

FIGS. 7(A-D) illustrate an example of an active modal antenna in accordance with the '402 patent, wherein FIG. 7A depicts a circuit board and a driven antenna element disposed thereon, a volume between the circuit board and the driven antenna element forms an antenna volume. A first parasitic element is positioned at least partially within the antenna volume, and further comprises a first active tuning element coupled therewith. The first active tuning element can be a passive or active component or series of components, and is adapted to alter a reactance on the first parasitic element either by way of a variable reactance, or shorting to ground, resulting in a frequency shift of the antenna. A second parasitic element is disposed about the circuit board and positioned outside of the antenna volume. The second parasitic element further comprises a second active tuning element which individually comprises one or more active and passive components. The second parasitic element is positioned adjacent to the driven element and yet outside of the antenna volume, resulting in an ability to shift the radiation pattern characteristics of the driven antenna element by varying a reactance thereon. This shifting of the antenna radiation pattern can be referred to as "beam steering". In instances where the antenna radiation pattern comprises a null, a similar operation can be referred to as "null steering" since the null can be shifted to an alternative position about the antenna. In the illustrated example, the second active tuning element comprises a switch for shorting the second parasitic to ground when "On" and for terminating the short when "Off". It should however be noted that a variable reactance on either of the first or second parasitic elements, for example by using a variable capacitor or other tunable component, may further provide a variable shifting of the antenna pattern or the frequency response. FIG. 7B illustrates the frequency ($f_0$) of the antenna when the first and second parasitic are switched "Off"; the frequency ($f_3$) of the antenna when the first parasitic is shorted to ground; and the frequencies ($f_4$; $f_0$) when the first and second parasitic elements are each shorted to ground. FIG. 7C depicts the antenna radiation pattern when both the first and second parasitic elements are "Off" (mode 1); and FIG. 7D depicts the antenna radiation pattern when both the first and second parasitic elements are shorted "On" (mode 2). Note that the radiation pattern of "mode 2" in FIG. 7D represents a shift of 90° in the antenna radiation pattern when compared to the initial pattern of the antenna in "mode 1" as illustrated in FIG. 7C. Further details of this type of modal antenna can be understood upon a review of the '402 patent.

An early application identified for use with such active modal antennas includes a receive diversity application described in commonly owned U.S. patent application Ser. No. 13/227,361, filed Sep. 7, 2011, and titled "MODAL ANTENNA WITH CORRELATION MANAGEMENT FOR DIVERSITY APPLICATIONS", wherein a single modal antenna can be configured to generate multiple radiating modes to provide a form of switched diversity. Certain benefits of this technique include a reduced volume required within the mobile device for a single antenna structure instead of a the volume required by a traditional two-antenna receive diversity scheme, a reduction in receive ports on the transceiver from two to one, and the resultant reduction in current consumption from this reduction in receive ports and associated conductive surfaces.

With Multiple Input Multiple Output (MIMO) systems becoming increasingly prevalent in the access point and cellular communication fields, the need for two or more antennas collocated in a mobile device or small form factor access point are becoming more common. These groups of antennas in a MIMO system need to have high, and preferably, equal efficiencies along with good isolation and low correlation. For handheld mobile devices the problem is exacerbated by antenna detuning caused by the multiple use cases of a device: hand loading of the cell phone, cell phone placed to user's head, cell phone placed on metal surface, etc. For both cell phone and access point applications, the multipath environment is constantly changing, which impacts throughput performance of the communication link.

Commonly owned U.S. patent application Ser. No. 12/894,052, filed Sep. 29, 2010, and titled "ANTENNA WITH ACTIVE ELEMENTS", describes an active antenna wherein one or multiple parasitic elements are positioned within the volume of the driven antenna. FIG. 7E illustrates an antenna with active elements in accordance with an embodiment, wherein the antenna 10 comprises a radiating element 11 positioned above a circuit board 13 to form an antenna volume therebetween, a first parasitic element 12 at least partially disposed within the antenna volume, and an active tuning element 14 coupled to the parasitic element. The impedance at the junction of the parasitic element and the ground plane is altered to effectuate a change in the resonant frequency of the antenna. For a driven antenna that is designed to contain multiple resonances at several frequencies, the multiple resonances can be shifted in frequency utilizing one or multiple parasitic elements. This results in a dynamically tunable antenna structure where the frequency response can be altered to optimize the antenna for transmission and reception over a wider frequency range than could be serviced by a passive antenna.

These and other active modal antenna techniques drive a need for a module or other circuit having active components for coupling with or integrated into the antenna. Such active components may include tunable capacitors, tunable inductors, switches, PIN diodes, varactor diodes, MEMS switches and tunable components, and phase shifters. Additionally, passive components may further be incorporated into such modules and other circuits for driving active antennas, whereas the passive components may include capacitors, inductors, and transmission lines with fixed and variable electrical delay for tuning the antenna. Accordingly, there is a present and ongoing need for modules or circuits for coupling with these and other active modal antennas.

SUMMARY OF THE INVENTION

A reconfigurable antenna system is described which combines active and passive components used to impedance match, alter the frequency response, and change the radiation pattern of an antenna. Re-use of components such as switches and tunable capacitors make the circuit topologies more space and cost effective, while reducing complexity of the control signaling required. Antenna structures with single and multiple feed and/or ground connections are described and active circuit topologies are shown for these configurations. A processor and algorithm can reside with the antenna circuitry, or the algorithm to control antenna optimization can be implemented in a processor within the host device.

BRIEF DESCRIPTION OF THE DRAWINGS

FIGS. 17(A-C) illustrate a technique which provides dual use of a tunable capacitor.

DESCRIPTION OF EMBODIMENTS

Figure 1:
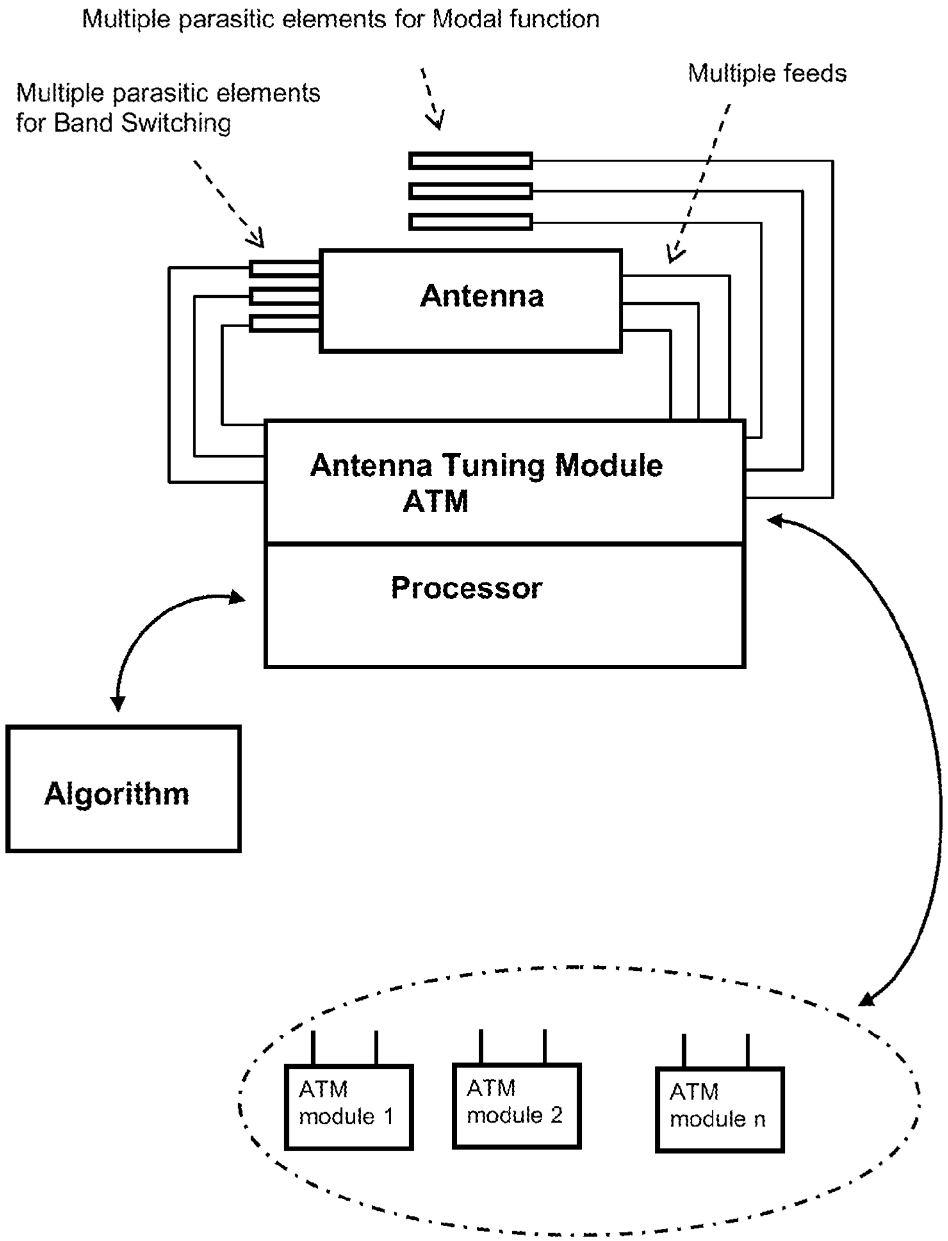
FIG. 1 illustrates a reconfigurable active antenna system utilizing a modal antenna and antenna tuning module (ATM) in accordance with an embodiment.

A reconfigurable active antenna system is provided. The antenna system is adapted to incorporate one or more dynamic impedance matching, band switching, and beam steering techniques in a variable feed and ground connection geometry sufficient to provide improved communication link performance by minimizing mismatch loss at the antenna/front end module interface.

In one embodiment, a modal antenna comprises passive and active components to enable multiple functions to include open and closed loop impedance matching, band switching of the antenna structure, a null steering function where multiple radiation patterns can be generated from the single antenna, and an algorithm to control and optimize the antenna system. The active elements are assembled into an antenna tuning module (ATM). The tuning functions incorporated into the modal antenna provide for a reconfigurable antenna that can be optimized for a wide variety of devices and form factors. The number of feed and ground connections on the antenna structure can be varied by the ATM to extend the frequency bandwidth of the antenna system or improve communication link performance.

A microprocessor is integrated into the antenna module to allow for full control of the tuning functions required of the antenna system. Alternately, the microprocessor can operate in conjunction with the processors in baseband and other portions of the host wireless device.

The tuning functions designed into the module provide an antenna system that adapts to environmental changes such as head and hand effects. A Modal antenna function which results in beam steering is incorporated into the antenna to provide multiple radiation pattern states for link quality improvement. Alternatively, the beam steering function can be used to modify antenna parameters to improve isolation between pairs of antennas or to reduce SAR (Specific Absorption Rate) and/or HAC (Hearing Aid Compatibility).

The antenna module is capable of both open and closed loop operation. For example, band switching, where the frequency response of the antenna is changed to allow the antenna to operate in another band, can be implemented open loop, with no correction for environmental effects. An example of closed loop operation is when the active matching circuit in the ATM is adjusted based upon metrics related to environmental effects such as reflected power monitored in the ATM and commands sent to the active component in the matching circuit to correct for impedance mismatch of the antenna. Additionally, information from proximity sensors can be used by the algorithm to alter antenna performance to better optimize the antenna to the current use condition.

The antenna tuning module can be configured for antenna topologies that contain a single feed point and single ground point or multiple feed and ground point locations. One example of the use of multiple ground points is an antenna topology wherein one ground point on the antenna is connected directly to ground and a second ground point is connected to a switch, with the switch connecting or disconnecting the antenna to ground. One or multiple passive or tunable components can be connected to the antenna ground point and the switch, or between the antenna switch port and the ground. By activating the switch the second ground point can be varied to shift the frequency response of the antenna. Alternately, the antenna impedance can be altered by activating the switch on the second ground point to tune the antenna for the frequency of interest or the current use condition.

In another embodiment, a two feed point configuration can be implemented wherein the first feed point and second feed points are coupled to a multi-port switch. The common port of the switch is connected to the transceiver and a tunable capacitor can be implemented on the first feed point and a fixed, passive matching circuit can be implemented on the second feed point. The feed point locations on the antenna element can be selected to optimize antenna performance for specific frequency bands or groups of bands, with the passive or tunable matching circuits optimized for these frequency bands. Alternately, tunable capacitors can be implemented on both the first and second feed points, with the tunable capacitor characteristics optimized for the frequency bands serviced by each feed point.

In another embodiment, a novel technique can be implemented wherein a single tunable capacitor is configured to provide both a tunable matching circuit and a band switching function on an antenna. This can be realized by locating a tunable capacitor in a matching circuit at the feed point of an antenna. One end of a transmission line can be coupled to the tunable capacitor, with the other end of the transmission line coupled to a parasitic element positioned in proximity to the antenna to band switch the antenna. Changing the capacitance of the tunable capacitor will result in a change in impedance of the matching circuit at the antenna feed point as well as a change in impedance at the parasitic/ground junction on the parasitic coupled to the antenna element. Proper design of the matching circuit is required to synchronize the impedance requirements of the matching circuit with the impedance requirements for the band switching function. A tunable inductor can be used in place of the tunable capacitor or in conjunction with the tunable capacitor.

Now turning to the drawings, FIG. 1 illustrates a block diagram of a reconfigurable active antenna system utilizing a Modal antenna and Antenna Tuning Module (ATM). Multiple feed lines connect the ATM to the antenna structure and multiple parasitic elements are coupled to the antenna structure to alter the frequency response of the antenna. Additionally, multiple parasitic elements are positioned in proximity to the antenna to alter the radiation mode of the antenna to provide a variable radiation pattern. ATM modules are used to populate the ATM to provide a repeatable, systemic approach to activating a large number of feed and ground connections. An algorithm to control the reconfigurable active antenna system resides in the processor with control signals being supplied from the processor to the ATM.

Figure 2:
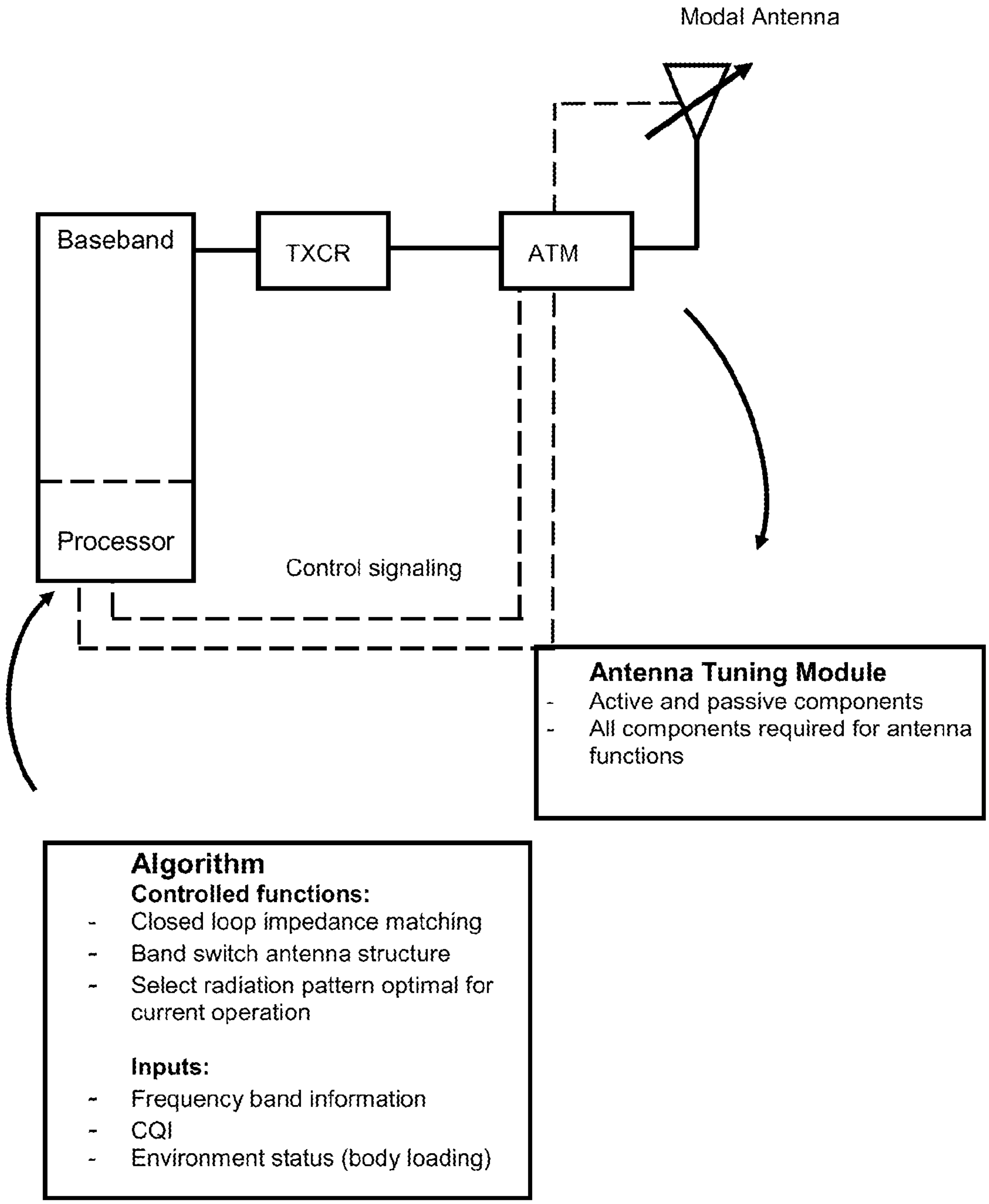
FIG. 2 illustrates a reconfigurable active antenna system utilizing a modal antenna and ATM in accordance with another embodiment.

FIG. 2 illustrates a reconfigurable active antenna system utilizing a Modal antenna and ATM (Antenna Tuning Module). An algorithm to control the active antenna system resides in the processor with control signals being supplied from the processor to the ATM.

Figure 3:
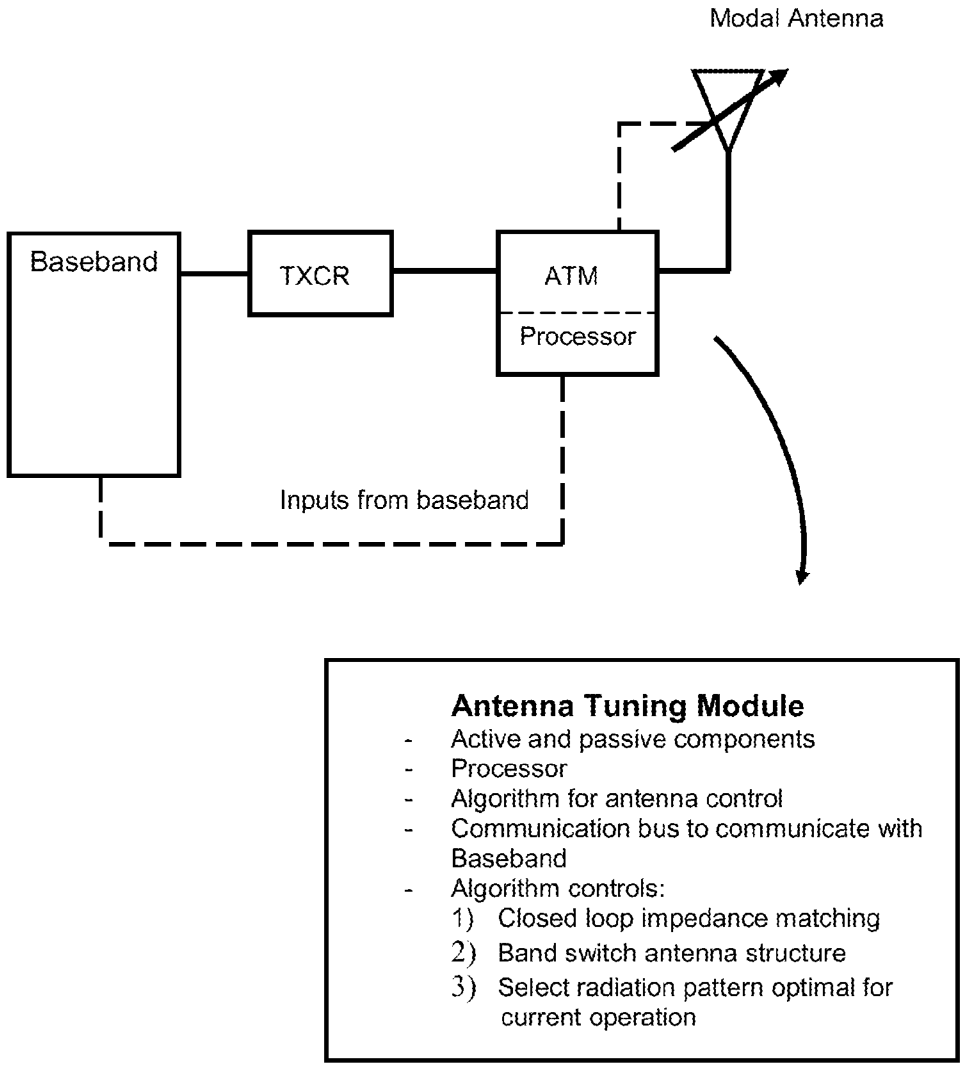
FIG. 3 illustrates a reconfigurable active antenna system utilizing a modal antenna and ATM, with the algorithm resident in the ATM.

FIG. 3 illustrates a reconfigurable active antenna system utilizing a Modal antenna and ATM, with the algorithm resident in the ATM. Input signals from the baseband processor are supplied to the ATM.

Figure 4:
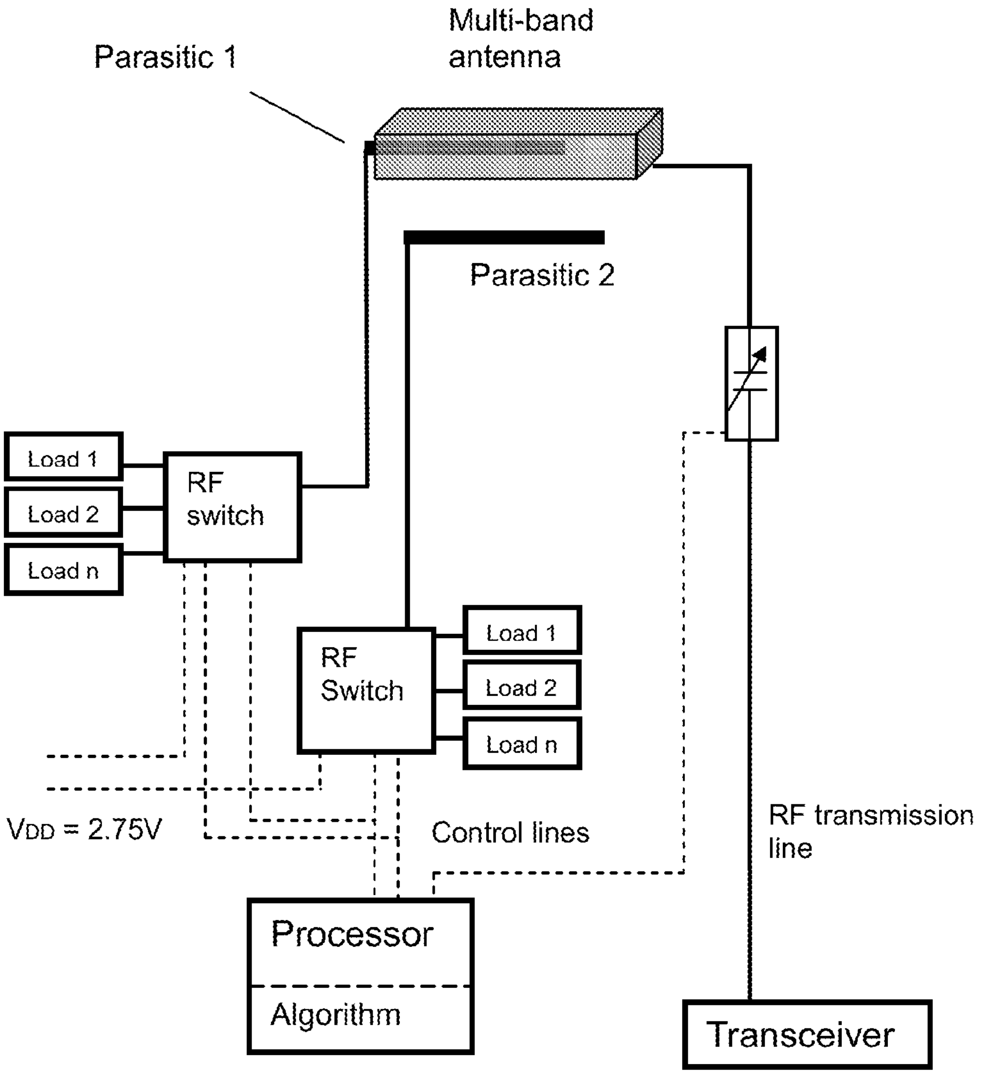
FIG. 4 illustrates a reconfigurable active antenna system comprising a modal antenna which utilizes two parasitic elements: parasitic 1 is positioned beneath the multi-band antenna and is used to alter the frequency response of the antenna; parasitic 2 is positioned in proximity to the antenna and is used to alter the radiation pattern of the antenna.

FIG. 4 illustrates a reconfigurable active antenna system comprising a Modal antenna which utilizes two parasitic elements: parasitic 1 is positioned beneath the IMD antenna and is used to alter the frequency response of the antenna;

parasitic 2 is positioned in proximity to the IMD antenna and is used to alter the radiation pattern of the IMD antenna. A multi-port RF switch with various impedance loadings on the ports is connected to each parasitic element. An active component, in this case a tunable capacitor, is attached to the feed point of the IMD antenna, between the IMD antenna and the transceiver, and is used to alter the impedance match of the IMD antenna. An algorithm embedded in the processor sends control signals to the active components to adjust the tuning of the antenna.

Figure 5:
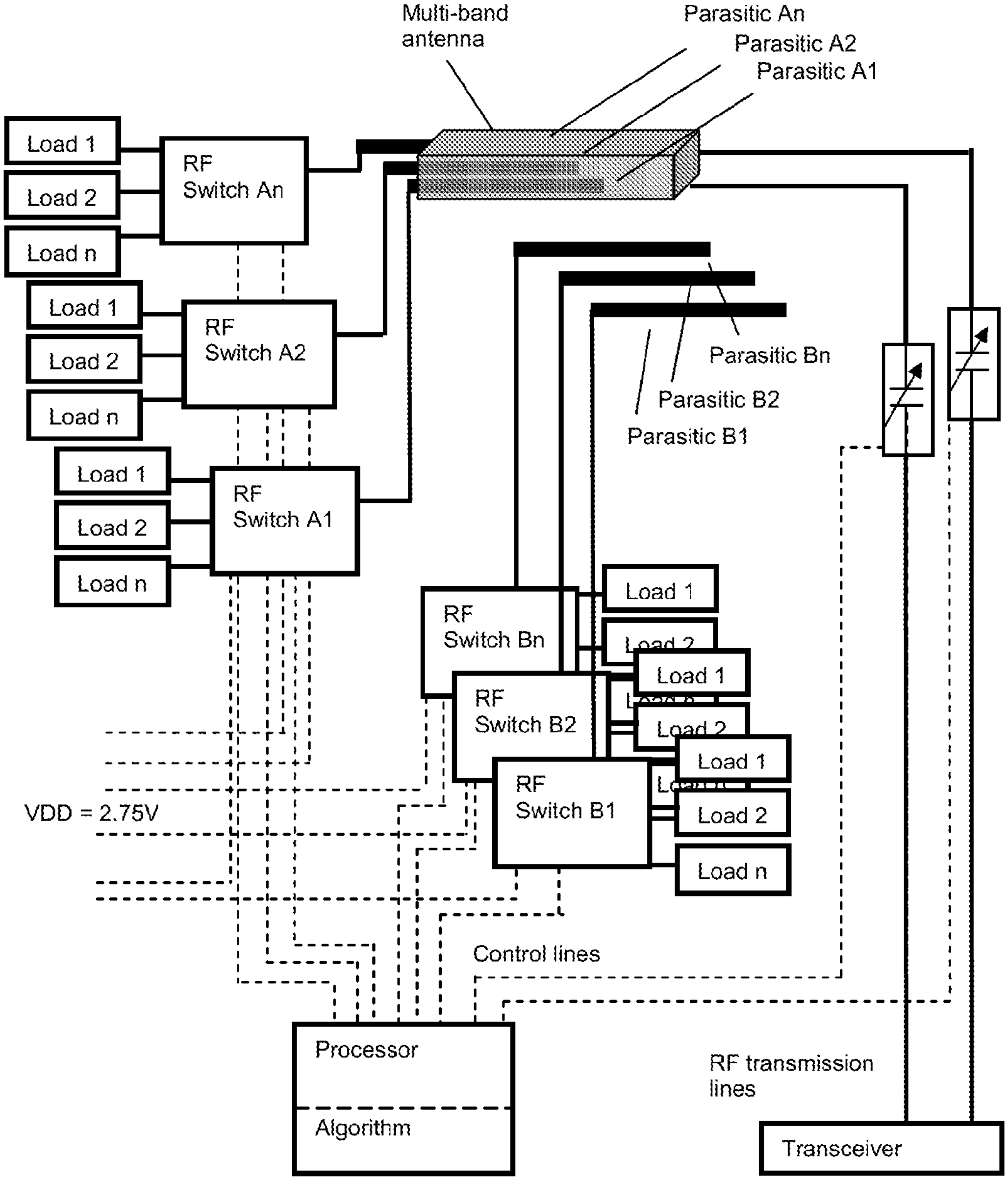
FIG. 5 illustrates a reconfigurable antenna system comprising a modal antenna which utilizes multiple parasitic elements, a plurality of which being positioned beneath the antenna structure for altering the frequency and a plurality of parasitic elements being in proximity to the antenna to alter the radiation mode.

FIG. 5 illustrates a generalized reconfigurable antenna system comprising a Modal antenna which utilizes multiple parasitic elements, positioned both beneath the antenna structure for altering the frequency and in proximity to the antenna to alter the radiation mode. ATM modules are connected to each parasitic to provide dynamic tuning of the impedance at the parasitic. Multiple feeds are integrated into the antenna design and connected to the transceiver with tunable components at the feed points to provide dynamic tuning of the antenna impedance. An algorithm embedded in the processor sends control signals to the active components to adjust the tuning of the antenna.

Figure 6:
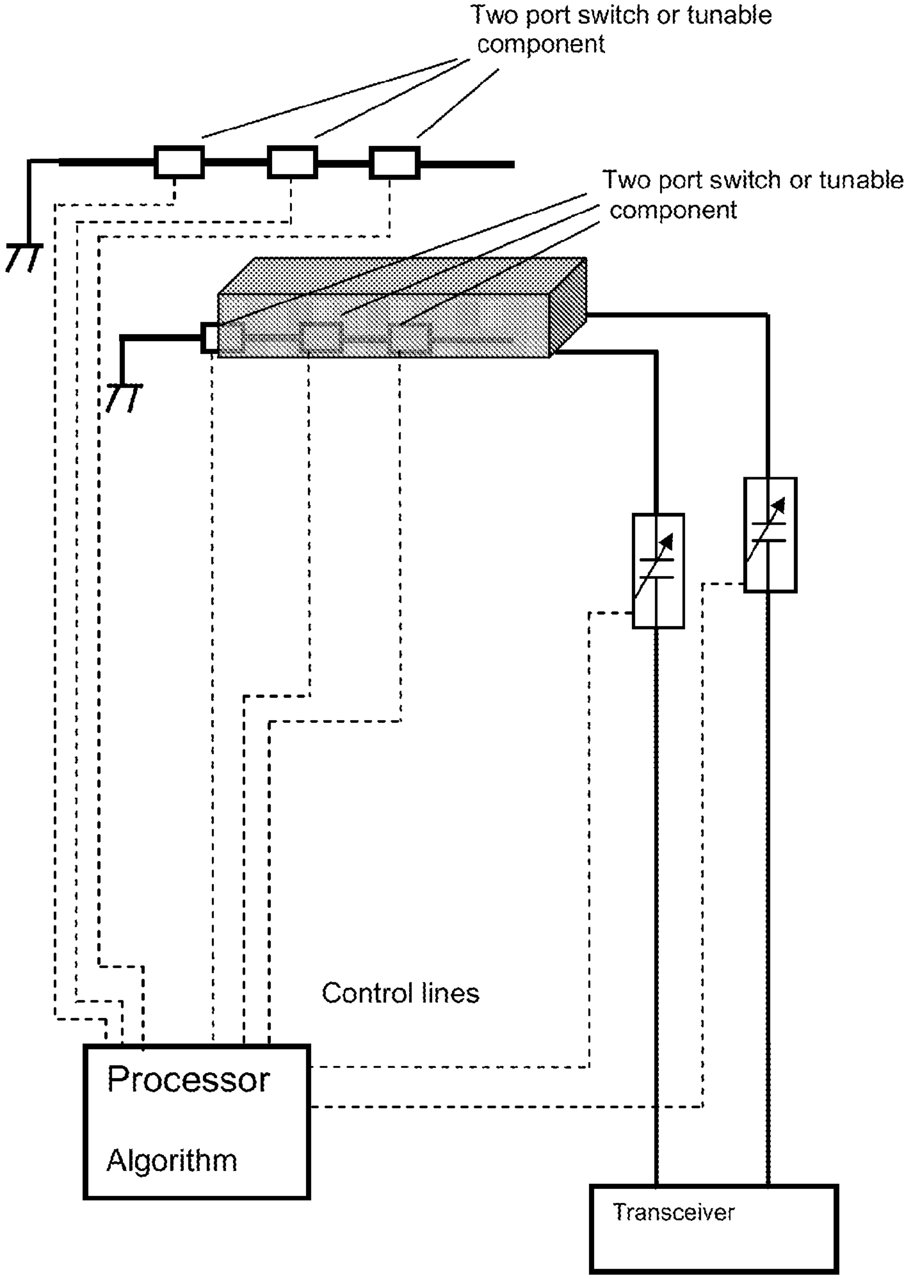
FIG. 6 illustrates a reconfigurable antenna system comprising a modal antenna which utilizes a first parasitic element positioned beneath the antenna structure for altering the frequency, and a second parasitic element in proximity to the antenna to alter the radiation mode.
Figure 7A:
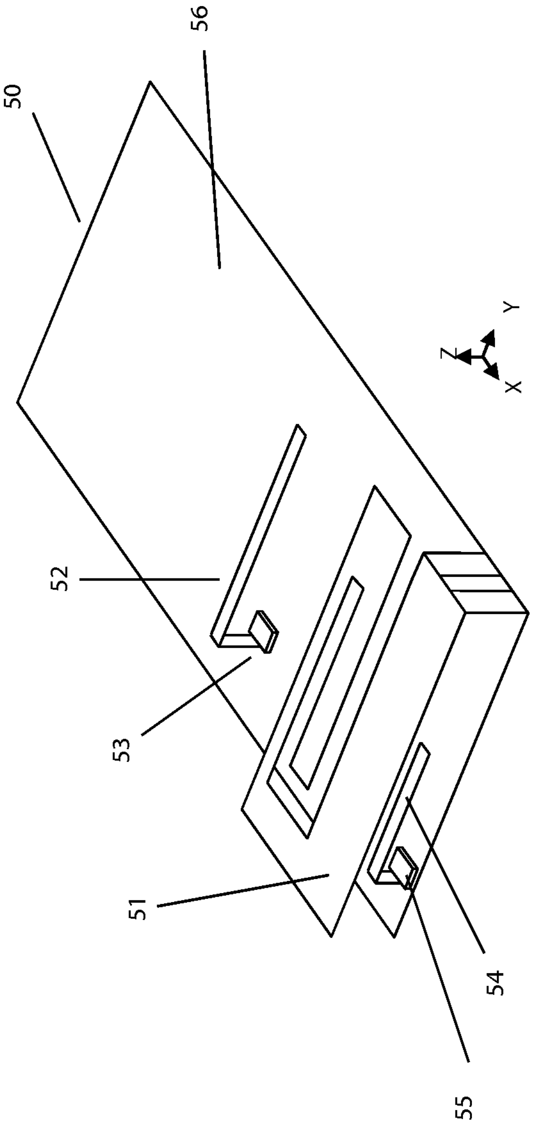
FIGS. 7(A-F) illustrate three active antenna techniques that can be implemented individually or combined to assemble a more capable antenna system, including an antenna configured for beam steering, an antenna with active elements, and an active matched antenna.
Figure 7B:
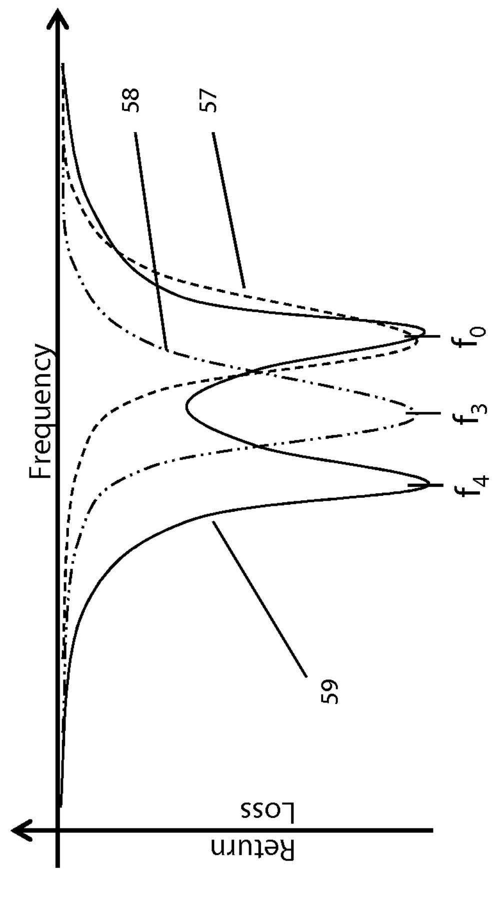
Figure 7C:
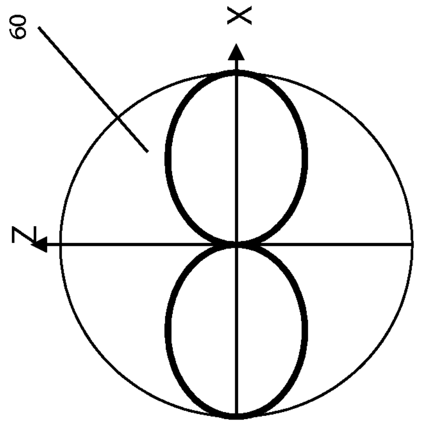
Figure 7D:
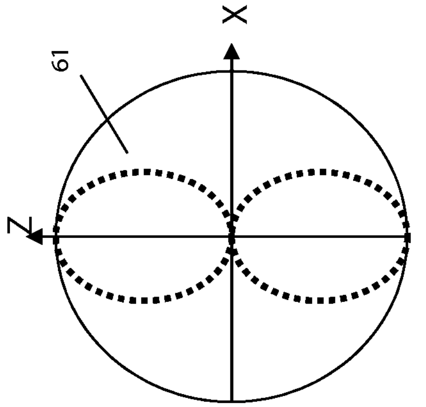
Figure 7E:
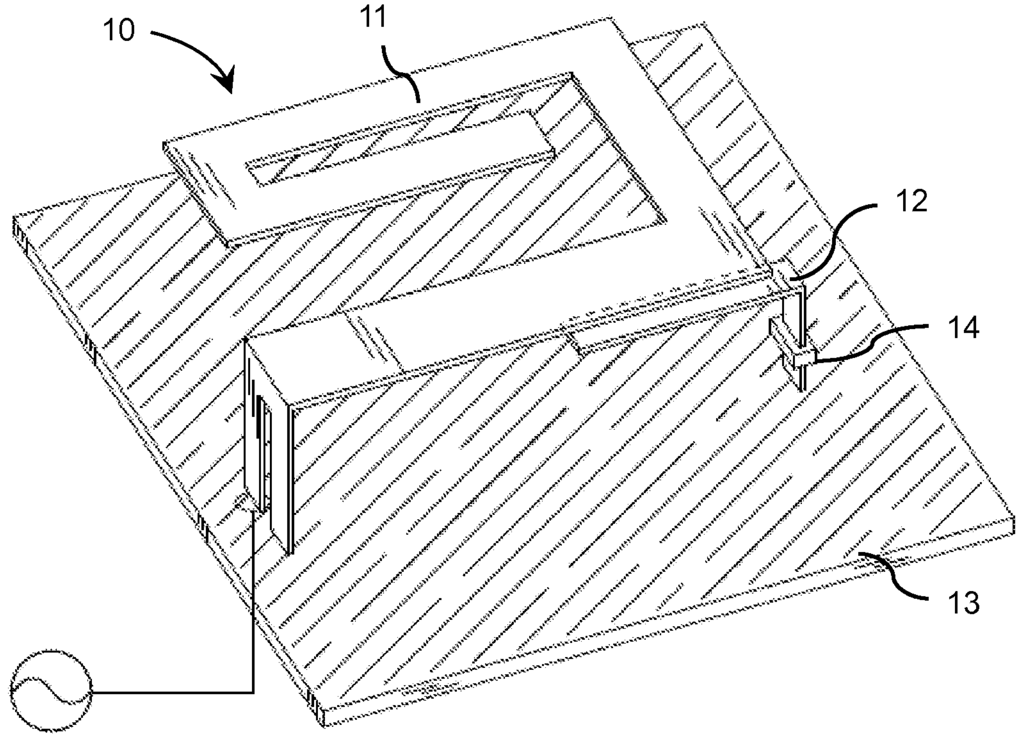
Figure 7F:
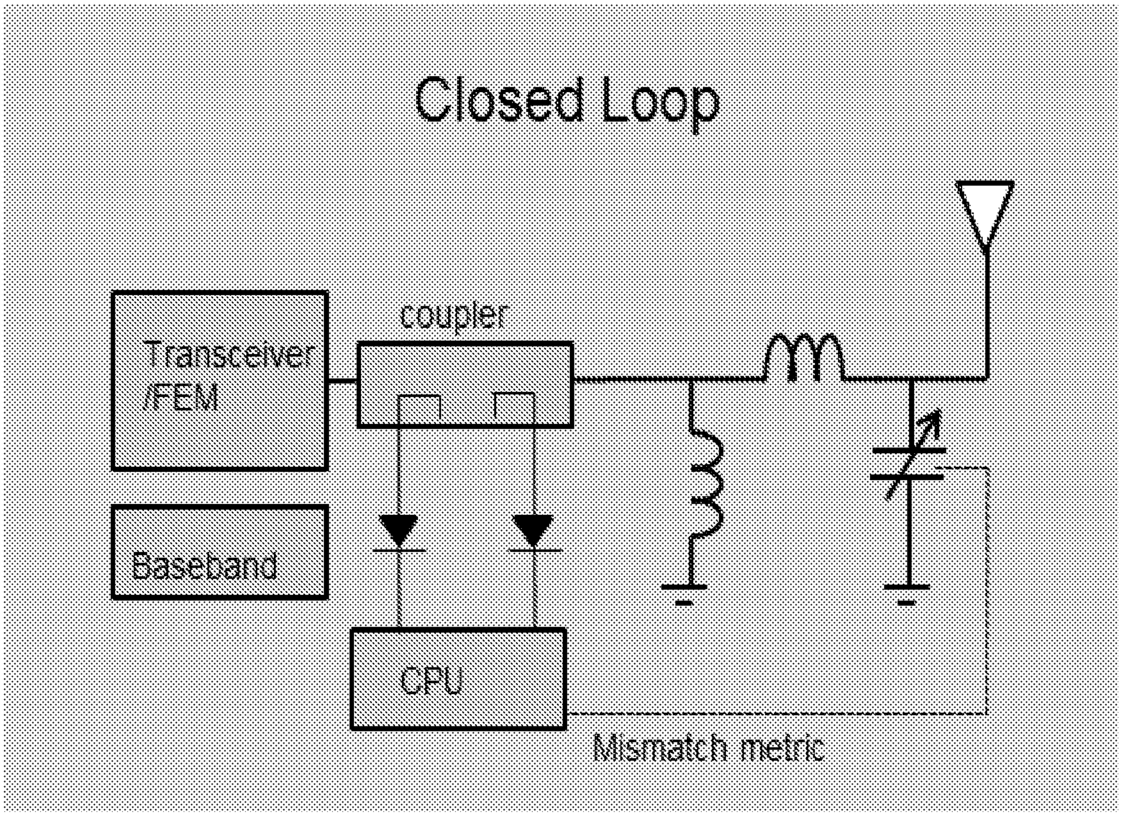

FIG. 6 illustrates a generalized reconfigurable antenna system comprising a Modal antenna which utilizes a first parasitic element positioned both beneath the antenna structure for altering the frequency, and a second parasitic element in proximity to the antenna to alter the radiation mode. Both first and second parasitic elements have multiple active components which are used to separate sections of the conductor forming the parasitic element. The active components are used to connect or disconnect sections of the conductor, providing a capability to increase or decrease the length of the parasitic element. The active components can be switches, tunable capacitors, tunable inductors, diodes, or other components. Multiple feeds are integrated into the antenna design and connected to the transceiver with tunable components at the feed points to provide dynamic tuning of the antenna impedance. An algorithm embedded in the processor sends control signals to the active components to adjust the tuning of the antenna.

FIGS. 7(A-F) illustrate three active antenna techniques that can be implemented individually or combined to assemble a more capable antenna system. A modal antenna is shown which provides the ability to change the radiation pattern of the Modal antenna. A band-switched antenna configuration is shown which provides the ability to dynamically tune the antenna radiator. An active matched antenna is shown wherein the impedance characteristics of the antenna can be dynamically altered.

Figure 8A:
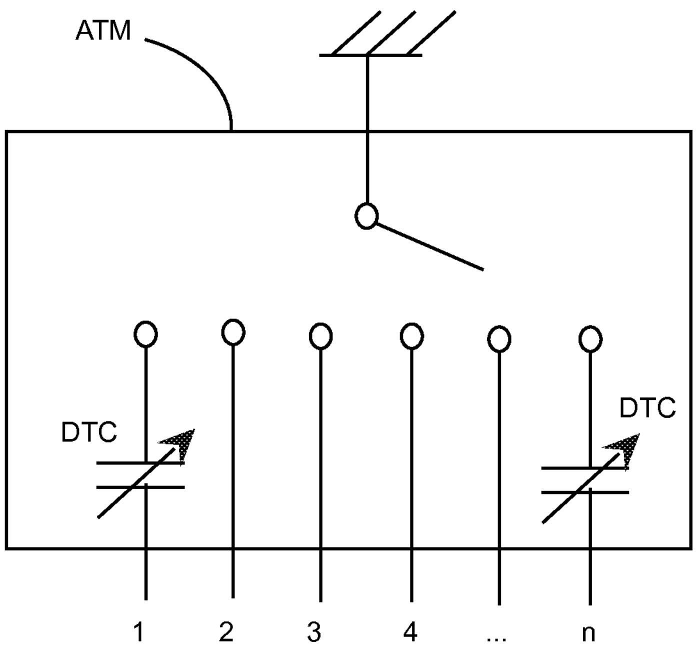
FIGS. 8(A-B) illustrate an n-port ATM wherein the feed and ground connections can be dynamically altered to optimize antenna performance.
Figure 8B:
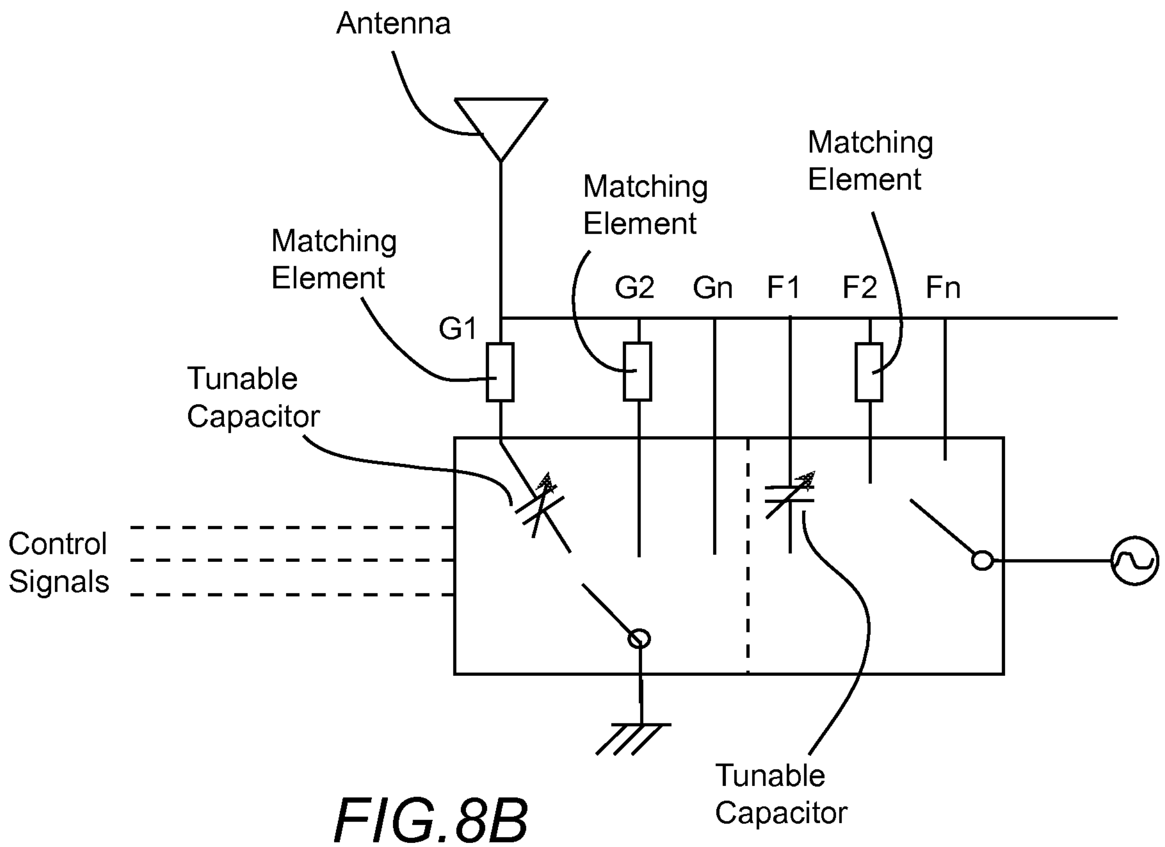

FIGS. 8(A-B) illustrate a generalized n-port ATM where the feed and ground connections can be dynamically altered to optimize antenna performance. Control signals from algorithm drive the ATM function.

Figure 9B:
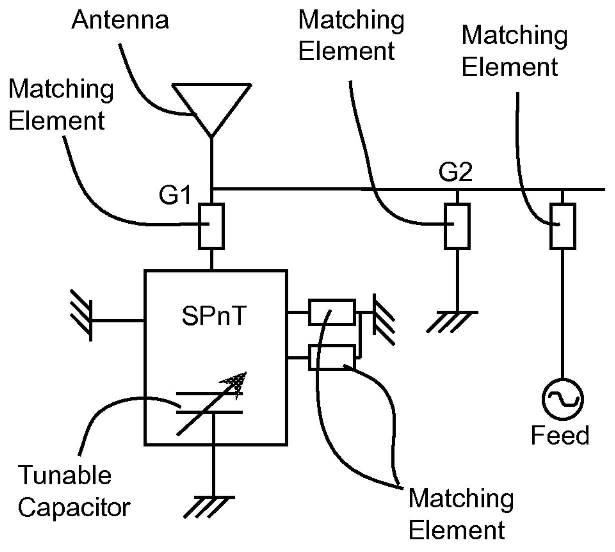
FIGS. 9(A-C) illustrate a reconfigurable antenna topology wherein a multi-port switch is coupled to a radiator to form a planar inverted f-antenna (PIFA) or isolated magnetic dipole (IMD) element.
Figure 9A:
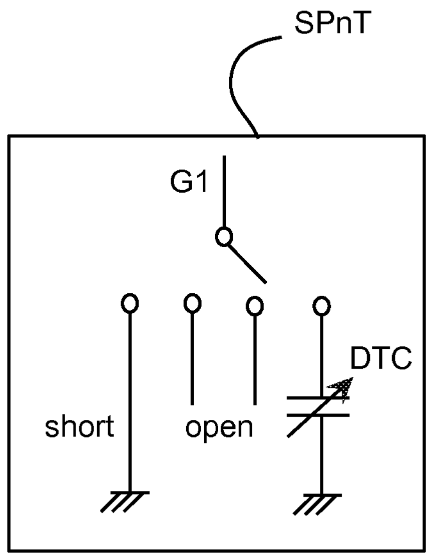
Figure 9C:
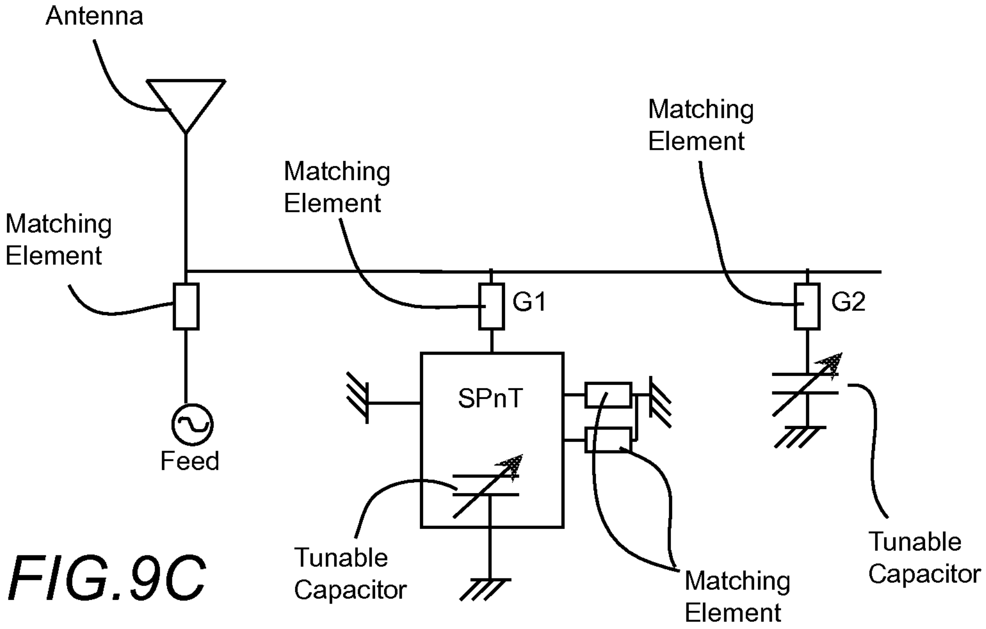

FIGS. 9(A-C) illustrate a reconfigurable antenna topology wherein a multi-port switch is coupled to a radiator to form a Pifa or IMD element. Coupling a component at G2 provides a fixed ground connection; G1 is an active ground connection that can be altered dynamically. Both G1 and G2 can be active ground connections that can tune to alter antenna performance.

Figure 10A:
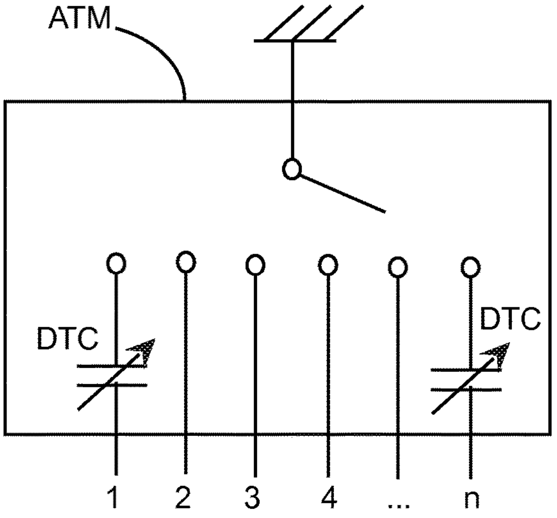
FIGS. 10(A-C) illustrate a reconfigurable antenna topology wherein two ground connections are configured on an antenna with a tunable capacitor coupled to ground G1.
Figure 10B:
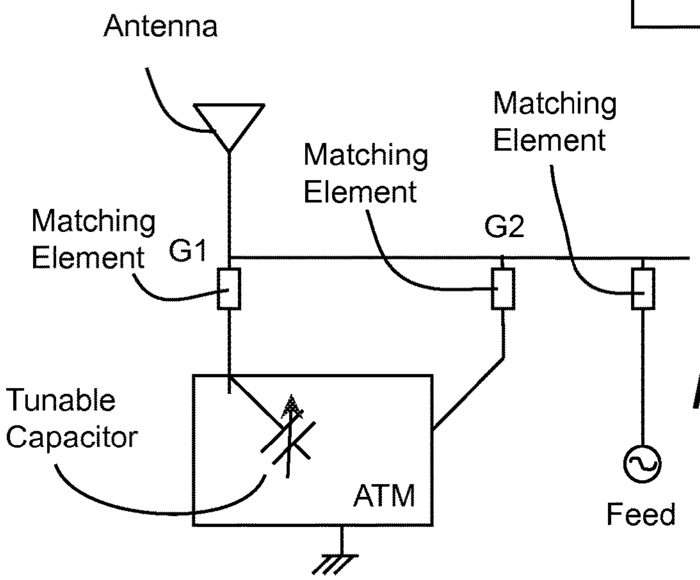
Figure 10C:
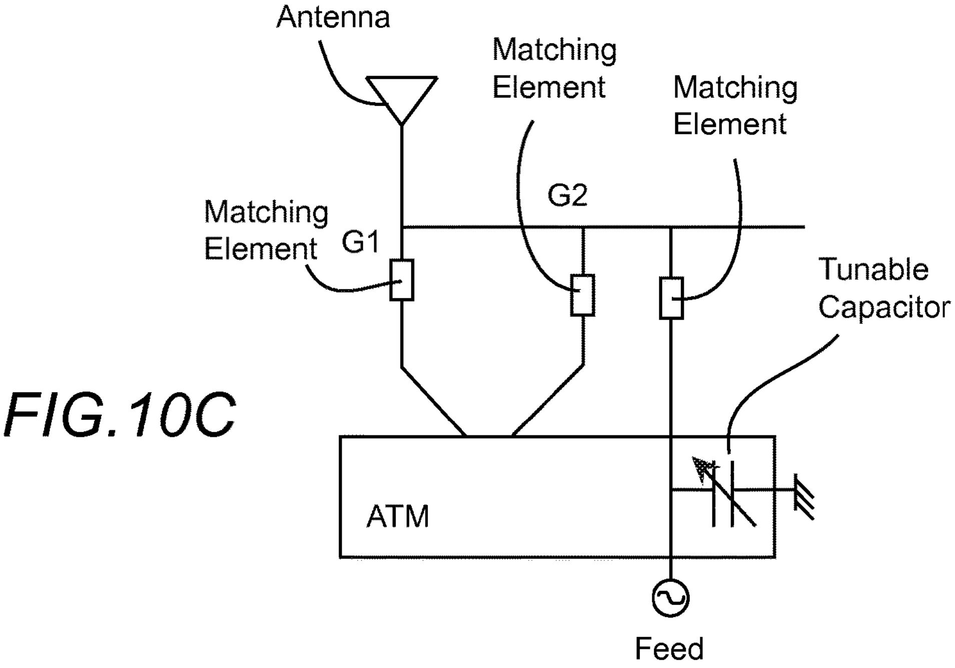

FIGS. 10(A-C) illustrate a reconfigurable antenna topology wherein two ground connections are configured on an antenna with a tunable capacitor coupled to ground G1. The tuning module contains a tunable capacitor and 4 port switch.

Figure 11:
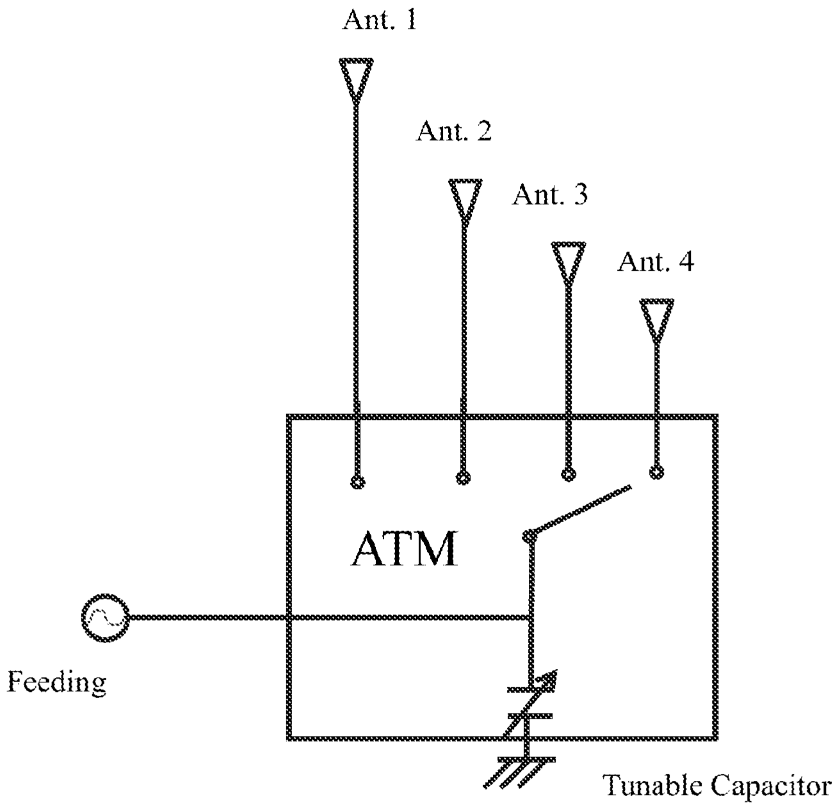
FIG. 11 illustrates a four antenna system configured to use the same tunable capacitor to tune the antenna.

FIG. 11 illustrates a four antenna system configured to use the same tunable capacitor to tune the antenna. A four port switch connects the antenna intended for use to the tunable capacitor and the transceiver.

Figure 12:
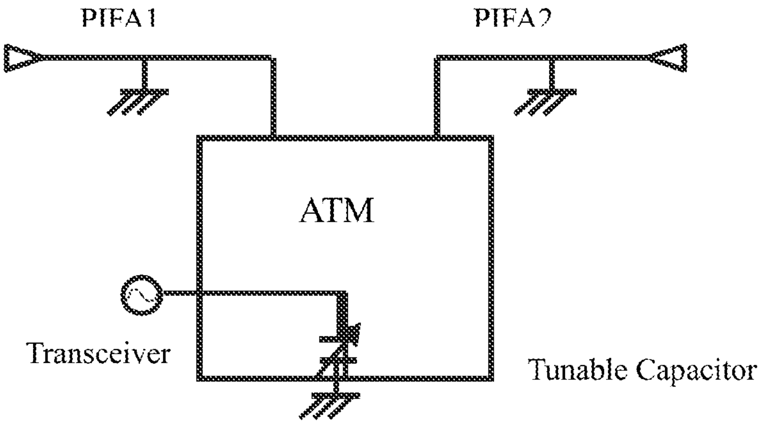
FIG. 12 illustrates a two antenna system configured to use the same tunable capacitor to tune the antenna.
Figure 12:
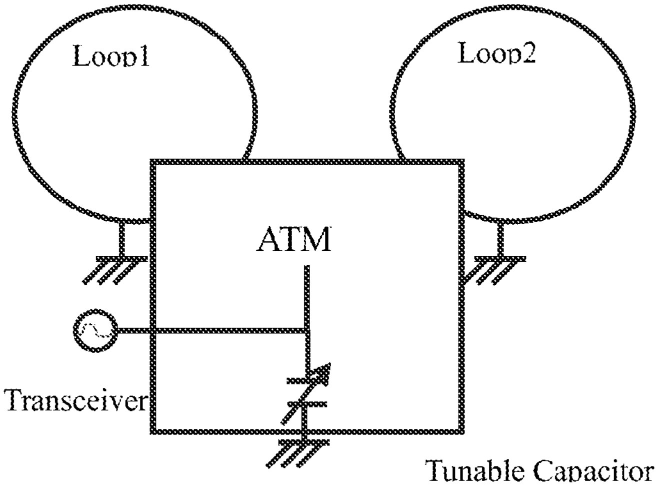

FIG. 12 illustrates a two antenna system configured to use the same tunable capacitor to tune the antenna. A two port switch connects the antenna intended for use to the tunable capacitor and the transceiver.

Figure 13A:
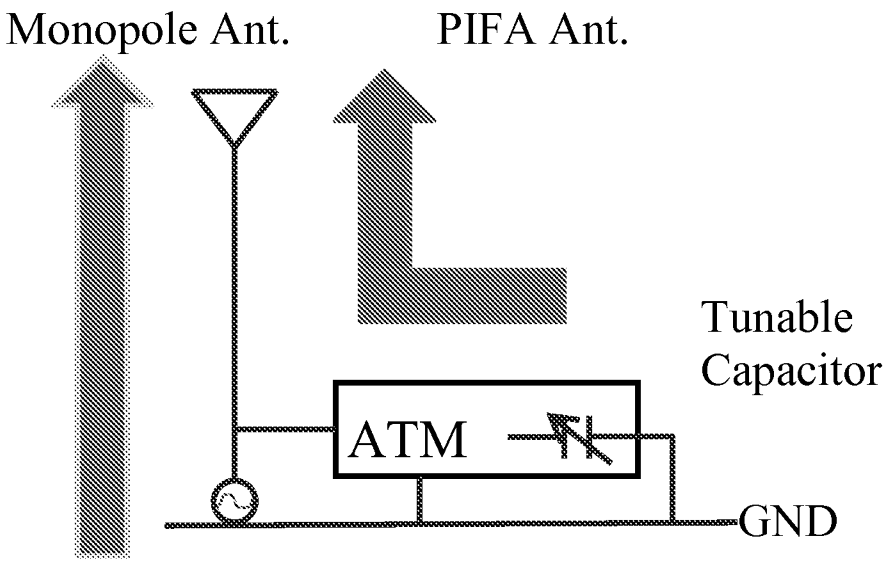
FIGS. 13(A-B) illustrate a reconfigurable antenna topology wherein a multi-port switch provides the capability of connecting or disconnecting a ground connection to the antenna, resulting in a monopole or PIFA type radiators.
Figure 13B:
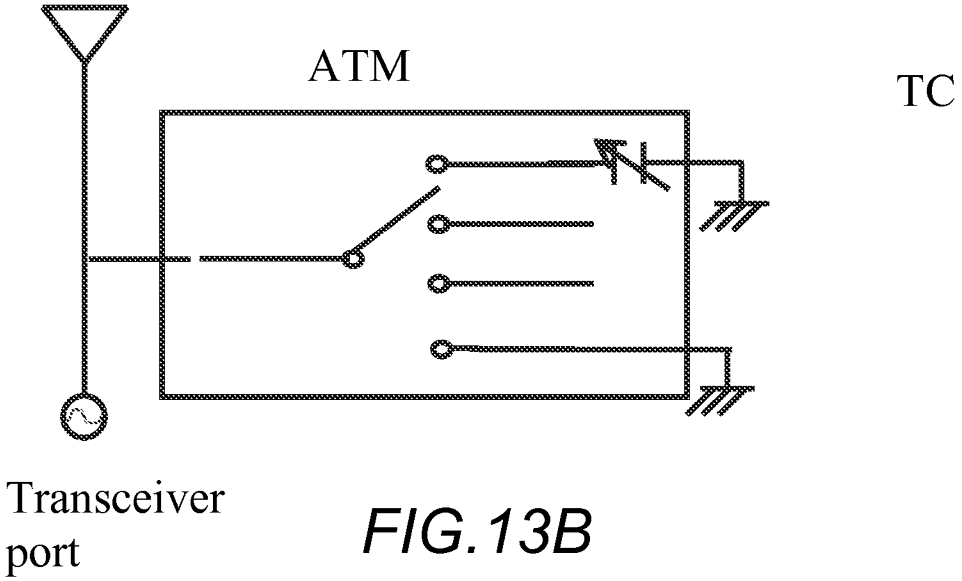

FIGS. 13(A-B) illustrate a reconfigurable antenna topology wherein a multi-port switch provides the capability of connecting or disconnecting a ground connection to the antenna, resulting in a monopole or Pifa type radiators. Additional ports of the switch can be reactively loaded to tune the antenna to different frequency bands or impedance states. A tunable capacitor is included to provide optimization of the antenna.

Figure 14A:
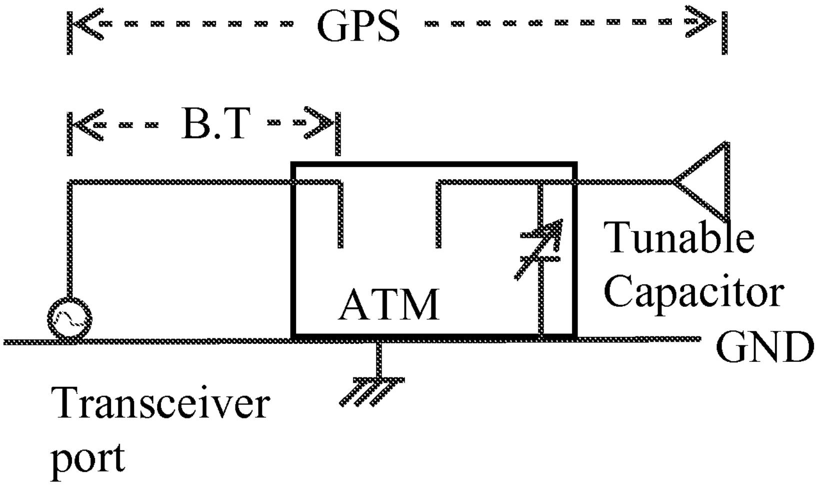
FIGS. 14(A-B) illustrate a reconfigurable antenna topology wherein a multi-port switch provides the capability of varying the length of a radiating element, resulting in an antenna that is optimized at several frequencies.
Figure 14B:
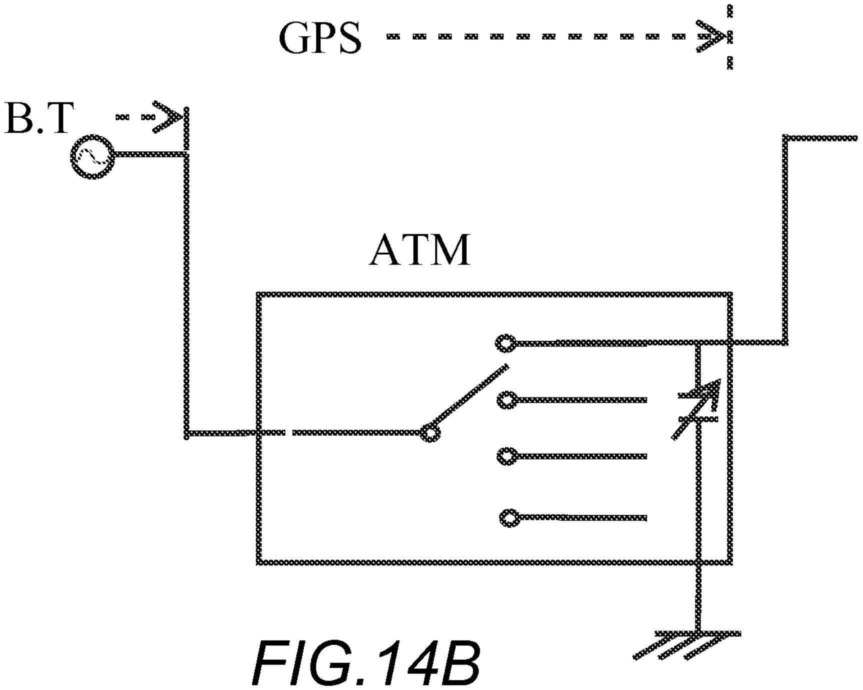

FIGS. 14(A-B) illustrate a reconfigurable antenna topology wherein a multi-port switch provides the capability of varying the length of a radiating element, resulting in an antenna that is optimized at several frequencies. An example use case is a combination GPS and Bluetooth antenna, where an additional length of conductor is connected to an existing conductor to reduce the frequency of operation of an antenna for GPS functions. Additional ports of the switch can be reactively loaded to tune the antenna to different frequency bands or impedance states. A tunable capacitor is included to provide optimization of the antenna.

Figure 15A:
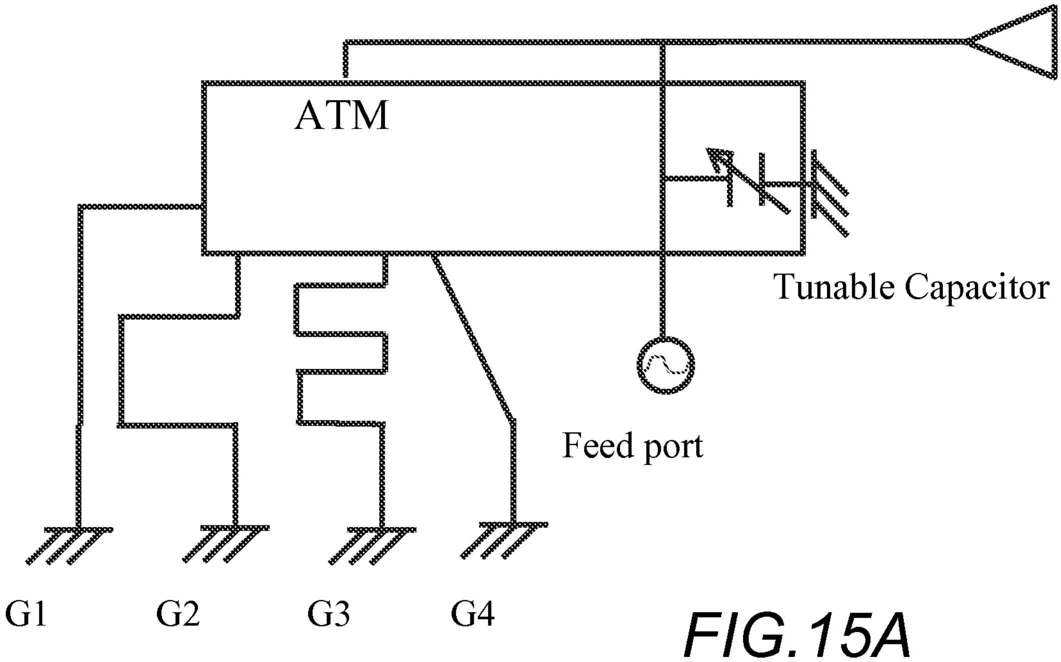
FIGS. 15(A-B) illustrate a reconfigurable antenna topology wherein a multi-port switch is coupled to the antenna to provide the capability of varying electrical length of the ground connection.
Figure 15B:
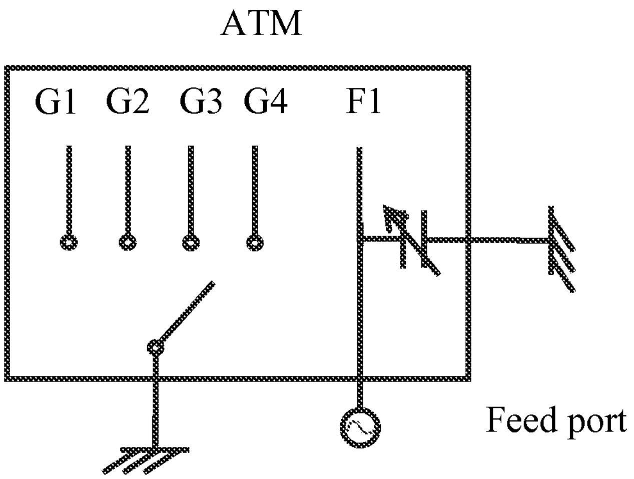

FIGS. 15(A-B) illustrate a reconfigurable antenna topology wherein a multi-port switch is coupled to the antenna to provide the capability of varying electrical length of the ground connection. A tunable capacitor is coupled to the antenna at the feed point to provide for dynamic tuning of the antenna.

Figure 16A:
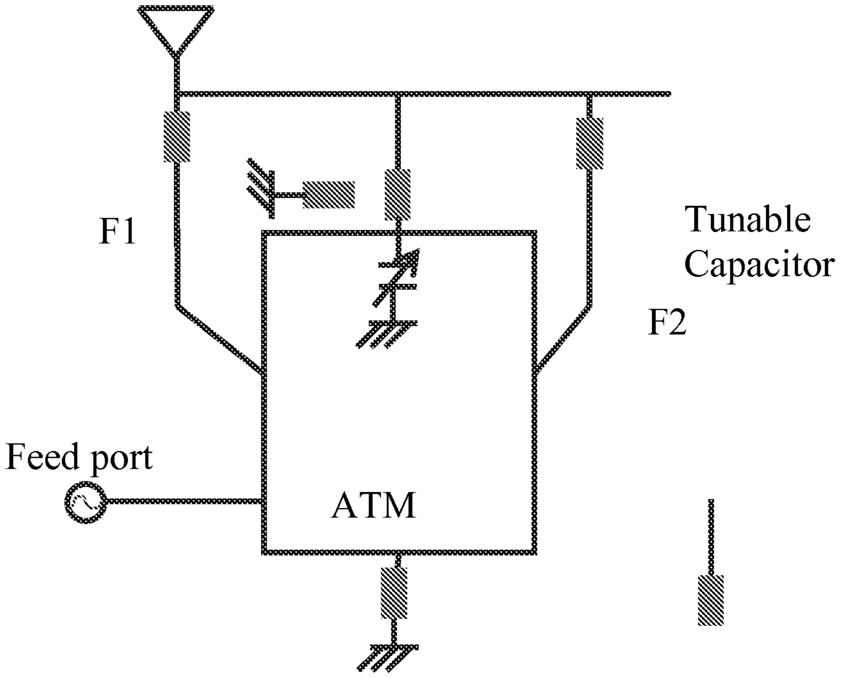
FIGS. 16(A-B) illustrate a reconfigurable antenna topology wherein a two-port switch is coupled to the antenna to provide the capability of selecting two feed locations.
Figure 16B:
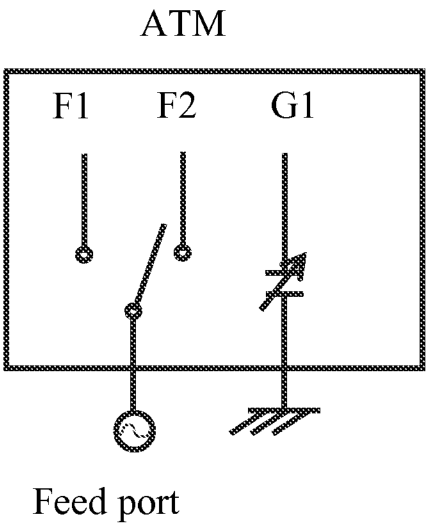

FIGS. 16(A-B) illustrate a reconfigurable antenna topology wherein a two-port switch is coupled to the antenna to provide the capability of selecting two feed locations. A tunable capacitor is coupled to the ground connection of the antenna; a passive connection is also available to provide two options for affecting a ground connection.

FIGS. 17(A-C) illustrate a technique which provides dual use of a tunable capacitor. The tunable capacitor is attached to the matching circuit in a shunt configuration; a transmission line is connected across the ends of the tunable capacitor, with the opposing end of the transmission line connected to portions of a parasitic element positioned beneath an IMD antenna. The tunable capacitor, when connected in this fashion, will provide the capability of altering the impedance of the matching circuit connected to the feed point of the IMD antenna while simultaneously altering the impedance loading of the parasitic element, which will in turn adjust the frequency response of the IMD antenna.

Figure 18A:
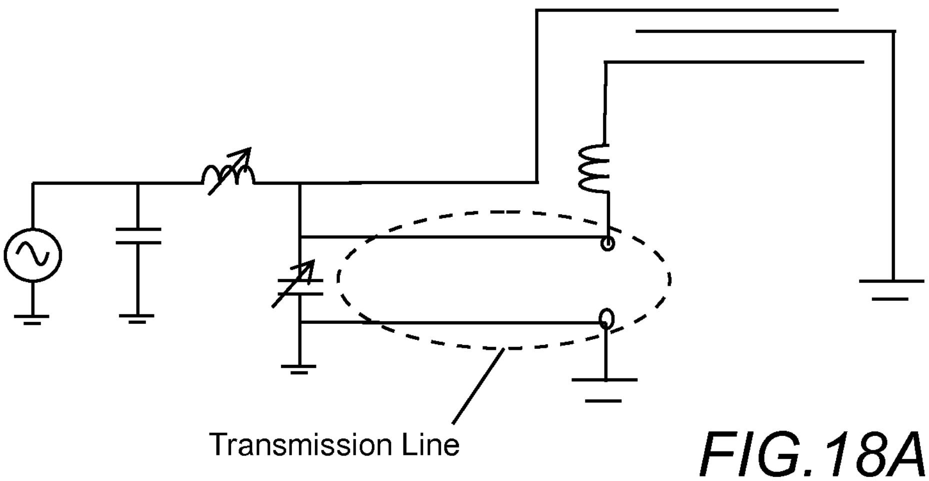
FIGS. 18(A-C) illustrate the technique shown in FIGS. 16(A-B) with the addition of an inductor at the junction of the transmission line and the parasitic element beneath the IMD antenna.
Figure 18B:
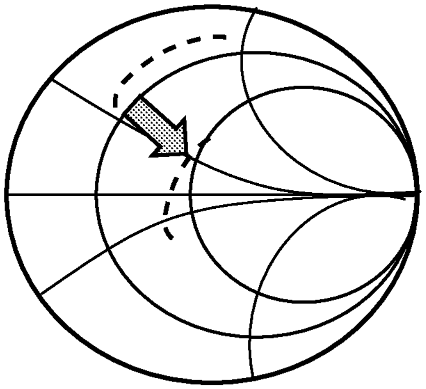
Figure 18C:
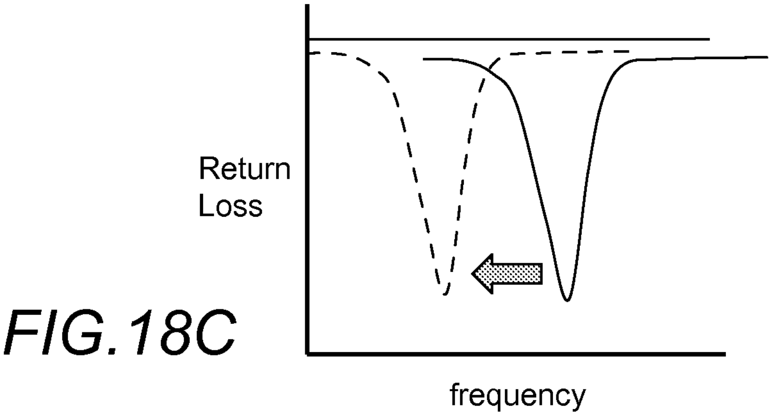

FIGS. 18(A-C) illustrate the technique shown in FIGS. 16(A-B) with the addition of an inductor at the junction of the transmission line and the parasitic element beneath the IMD antenna. The addition of an inductor of the proper value provides the capability of shifting the frequency response of the IMD antenna in an opposite fashion compared to the antenna configuration shown in FIGS. 17(A-C).

Figure 19:
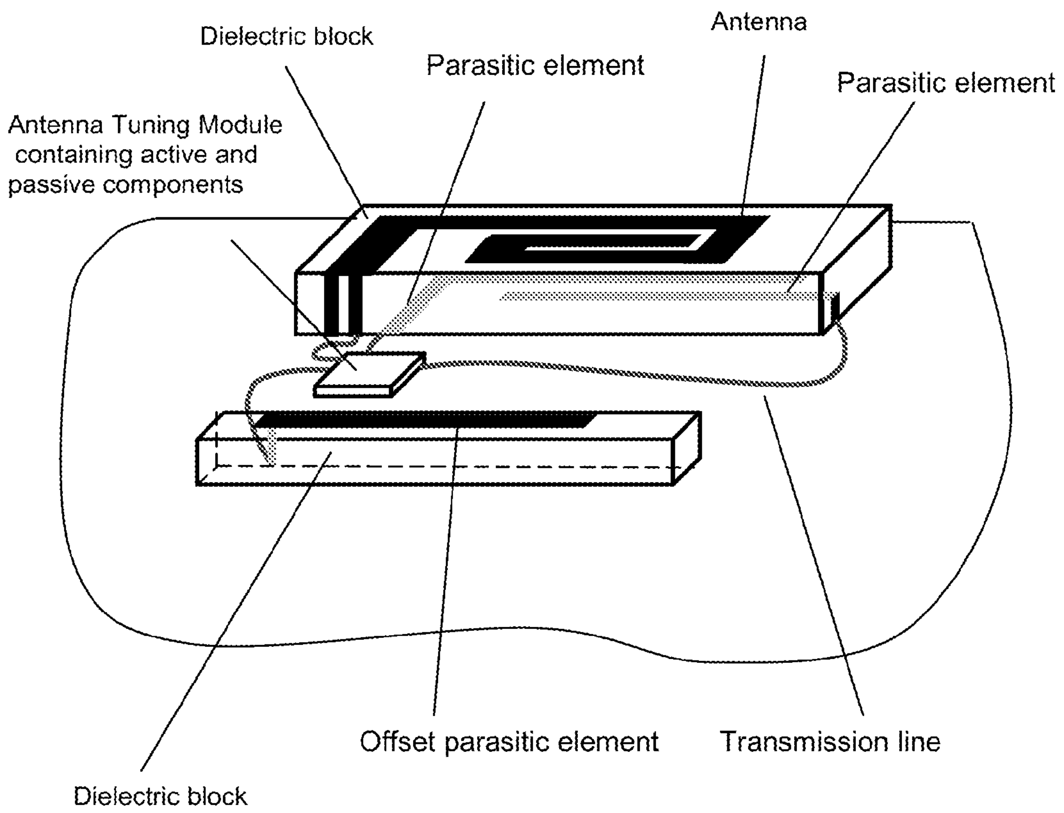
FIG. 19 illustrates a method of dielectric loading the antenna in the region between the antenna and the parasitic elements positioned beneath the antenna.

FIG. 19 illustrates a method of dielectric loading the antenna in the region between the antenna and the parasitic elements positioned beneath the antenna. Implementing a solid block of dielectric also provides a method of mechanical support of both the antenna element and parasitic elements. A separate dielectric block is used to support an offset parasitic element used to alter the radiation patterns of the antenna. A single module contains all active and passive components to provide the active antenna functions of the antenna.

Figure 20:
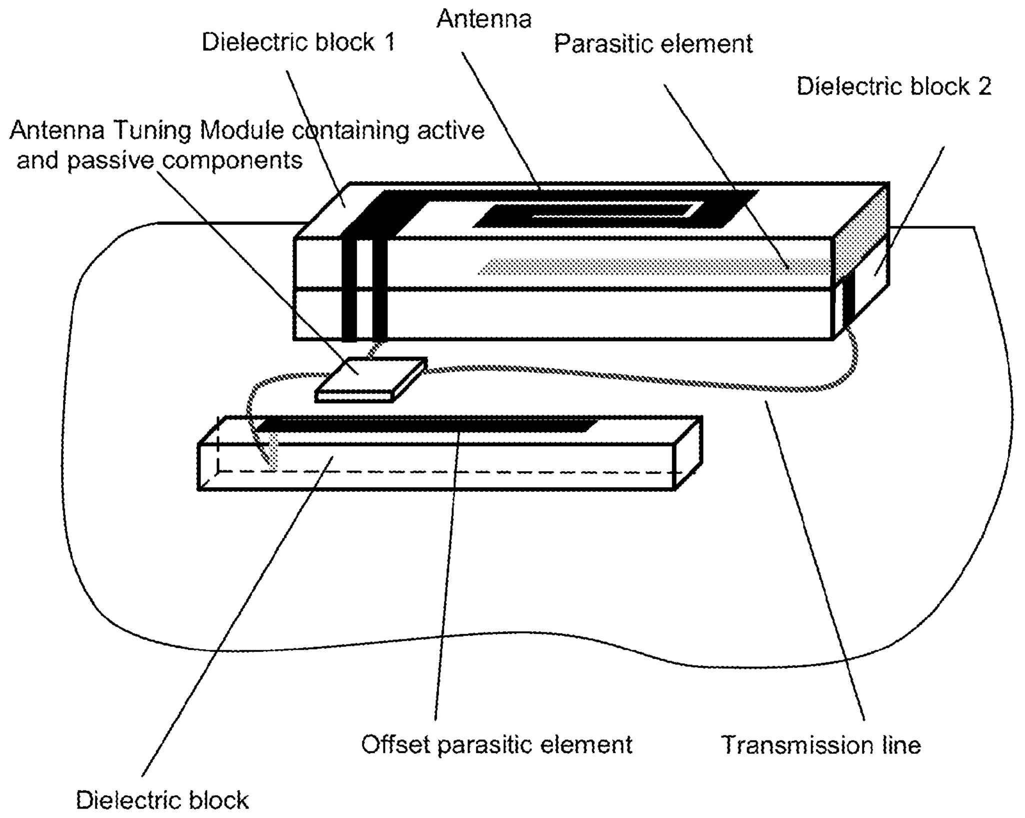
FIG. 20 illustrates a method of dielectric loading the antenna in the region between the antenna and the parasitic elements positioned beneath the antenna.

FIG. 20 illustrates a method of dielectric loading the antenna in the region between the antenna and the parasitic elements positioned beneath the antenna, wherein two different dielectrics are used to. Changing dielectric constant of the material in portions of the region between the antenna and the parasitic elements provides an additional parameter for optimizing the antenna performance. Implementing a solid block of dielectric wherein two or more different dielectric constants are implemented also provides a method of mechanical support of both the antenna element and parasitic elements. A separate dielectric block is used to support an offset parasitic element used to alter the radiation patterns of the antenna. A single module contains all active and passive components to provide the active antenna functions of the antenna.

Figure 21:
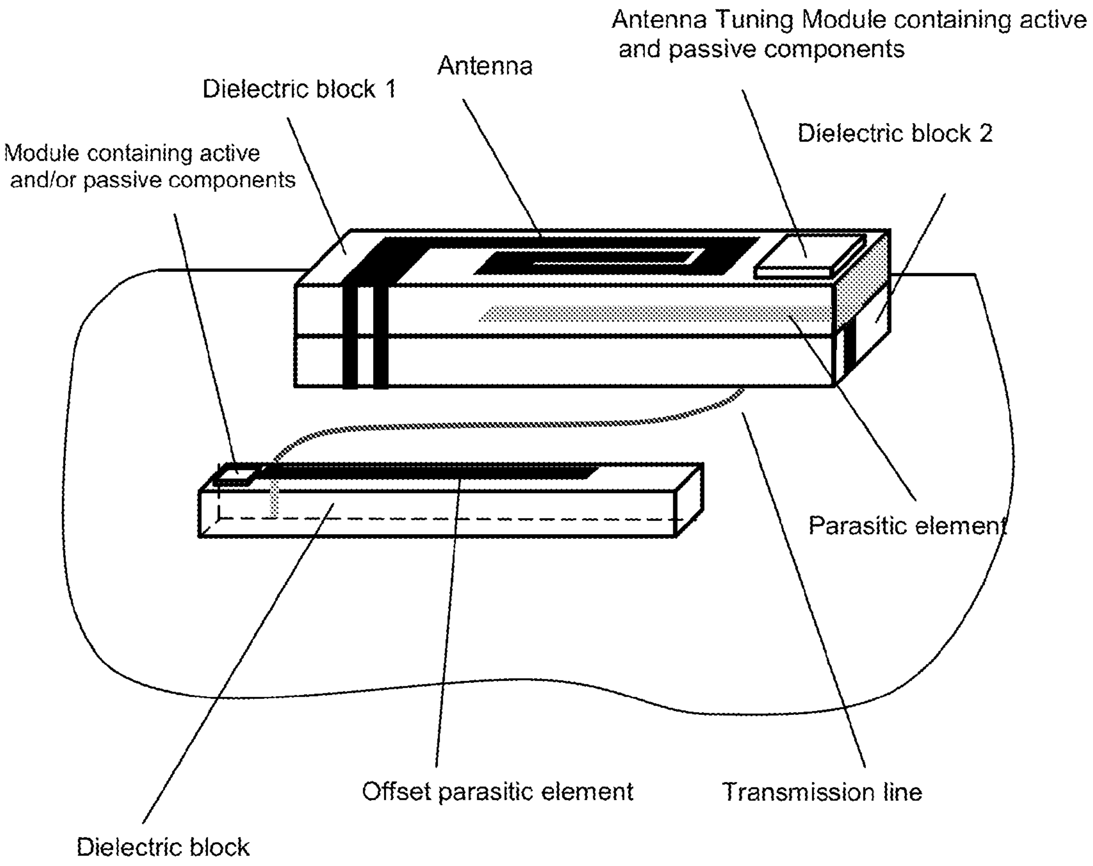
FIG. 21 illustrates an integrated method of fabricating an active antenna wherein the module containing active and passive components is attached directly to the dielectric support structure of the antenna.

FIG. 21 illustrates an integrated method of fabricating an active antenna wherein the module containing active and passive components is attached directly to the dielectric support structure of the antenna. The dielectric support for the antenna has two different dielectric materials in the region between the antenna and the parasitic elements positioned beneath the antenna. Changing dielectric constant of the material in portions of the region between the antenna and the parasitic elements provides an additional parameter for optimizing the antenna performance. Implementing a solid block of dielectric wherein two or more different dielectric constants are implemented also provides a method of mechanical support of both the antenna element and parasitic elements. A separate dielectric block is used to support an offset parasitic element used to alter the radiation patterns of the antenna. A second module, which contains active and/or passive components used with the offset parasitic element, is attached directly to the dielectric support structure of the parasitic element.

Figure 22:
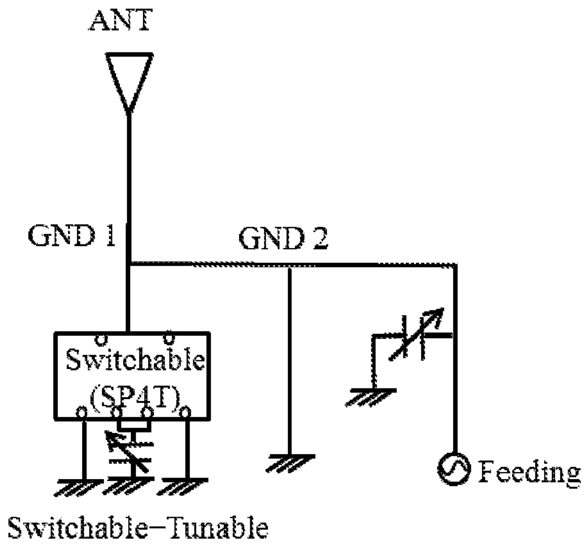
FIG. 22 shows an antenna architecture including an antenna, and ST Module at a first ground connection, a second ground connection; and a tunable component for matching the feed point of the antenna.

In another embodiment, an antenna is coupled to a module configured for switching and tuning the impedance of the antenna ground connection, the module can be referred to herein as an "ST Module" referring to the ability to switch and tune the antenna ground connection. FIG. 22 shows an antenna architecture including an antenna, and ST Module at a first ground connection, a second ground connection; and a tunable component for matching the feed point of the antenna. The ST Module itself can be configured in accordance with a myriad of architectures as can be understood by those having skill in the art, for example two, three, four, or "N" switchable ports can be provided with each port having a distinct load. The switch selects the port of the plurality of ports for providing the desired load. A tunable component, for example a tunable capacitor, is configured in shunt to the antenna port of the switch for tuning the reactance at the module. Thus, the ST module provides a switchable and tunable antenna ground connection.

Figure 23:
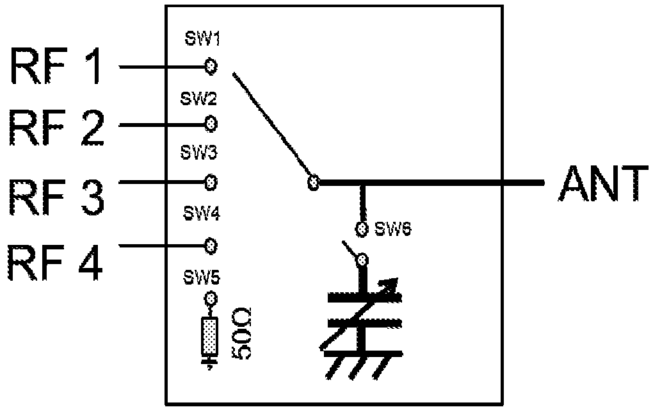
FIG. 23 shows the ST Module of FIG. 22 in further detail.

FIG. 23 shows the ST Module of FIG. 22 in further detail. In the illustrated embodiment, the ST Module comprises a five port switch, wherein one of the ports is configured to terminate the antenna with a 50 ohm load, effectively turning the antenna off. This load will disconnect the antenna from the transceiver.

Figure 24:
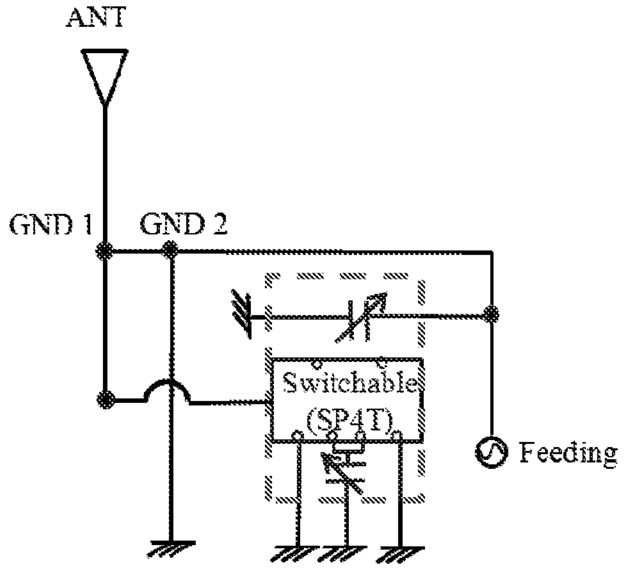
FIG. 24 illustrates an STT Module.

In yet another embodiment, an antenna is coupled to a module configured for switching and tuning the antenna ground connection similar to the ST Module, and is further configured with an additional tunable component capable of servicing a variety of additional applications, such as impedance matching the antenna, or tuning an additional antenna; this module can be referred to herein as an "STT Module". FIG. 24 illustrates an example antenna architecture wherein an antenna is coupled to an STT Module in a similar fashion as described above, and a second ground or reference. In the illustrated example, the second tunable component is configured for tunable matching, though it would be recognized by those having skill in the art that this additional tunable component may be used for any purpose, including tuning the illustrated antenna, another antenna, or any other device or component which can utilize a tunable cap. The second tunable component is contained within the STT Module and configured for coupling with the antenna feed point during installation within a communication device.

Thus, FIG. 24 illustrates an STT Module, similar to the ST Module, above, and further configured with a second tunable capacitor within the module to provide the capability of tuning the antenna impedance at the feed point as well as provide a switchable and tunable capacitor circuit for altering the impedance of the ground connection. This provides an additional degree of freedom compared to a typical tunable matching circuit where one or two tunable capacitors are configured to impedance match the antenna. The topology proposed here provides the ability to tune both the feed and ground connections of an antenna simultaneously. The result is an RFIC where band switching (alter impedance of the ground connection) and impedance matching (the tunable capacitor for the feed connection) are implemented.

Figure 25:
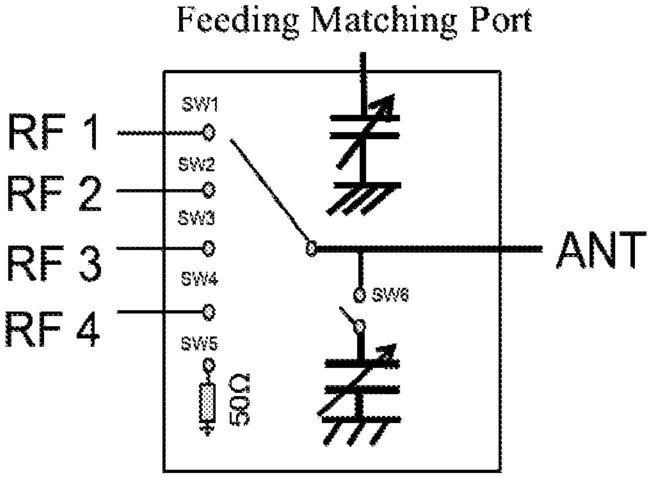
FIG. 25 illustrates the STT Module in further detail.

FIG. 25 illustrates the STT Module in further detail, which comprises a five port switch having four distinct ports (labeled RF ports) and a termination load (50 Ohms) for terminating connection with the transceiver; a first tunable component, for example a tunable capacitor, coupled to the switch and the antenna in shunt; and a second tunable component with an open lead for connecting to the antenna feed point, another antenna, or another device requiring a tunable reactance Thus, in an embodiment an antenna with one or more feed connections and one or more ground connections is described. A single integrated circuit configured to provide a tunable capacitor which can be connected to the feed connection of the antenna. A multi-port switch is configured to connect to one or more of the ground connections of the antenna. A tunable capacitor is connected to one of the switch ports to provide the capability of altering the impedance of the switch port.

What is claimed is:

1. An antenna system, comprising:

an antenna comprising a feed point;

a parasitic element positioned in proximity to the antenna;

a matching circuit coupled to the feed point, the matching circuit comprising:

a tunable capacitor; and a transmission line coupled to the tunable capacitor and the parasitic element, wherein the tunable capacitor is operable to alter impedance of the matching circuit at the feed point and impedance of the parasitic element at a parasitic-ground junction on the parasitic element based at least in part on a change in capacitance of the tunable capacitor; and a tunable inductor positioned between the feed point and the antenna, wherein the tunable inductor is coupled to the feed point, the antenna, and the matching circuit, and wherein the matching circuit is coupled to the feed point via the tunable inductor.

2. The antenna system of claim 1, wherein the tunable capacitor is operable to simultaneously alter the impedance of the matching circuit and the impedance of the parasitic element based at least in part on the change in the capacitance of the tunable capacitor.

3. The antenna system of claim 1, wherein the tunable capacitor is operable to adjust a frequency response of the antenna based at least in part on simultaneous alteration of the impedance of the matching circuit and the impedance of the parasitic element based at least in part on the change in the capacitance of the tunable capacitor.

4. The antenna system of claim 1, wherein the tunable capacitor is coupled to the matching circuit in a shunt configuration.

5. The antenna system of claim 1, wherein a first end of the transmission line is coupled to the tunable capacitor and a second end of the transmission line is coupled to the parasitic element.

6. The antenna system of claim 1, wherein the antenna comprises at least one of a modal antenna or an isolated magnetic dipole antenna.

7. An antenna system, comprising:

an antenna comprising a feed point;

a parasitic element positioned in proximity to the antenna;

an inductor positioned on the parasitic element; and a matching circuit coupled to the feed point, the matching circuit comprising:

a tunable capacitor; and a transmission line coupled to the tunable capacitor and the inductor, the transmission line coupled to the inductor at a junction of the transmission line and the parasitic element, wherein the tunable capacitor and the inductor are operable to alter impedance of the matching circuit and impedance of the parasitic element based at least in part on a change in capacitance of the tunable capacitor;

a tunable inductor positioned between the feed point and the antenna, wherein the tunable inductor is coupled to the feed point, the antenna, and the matching circuit, and wherein the matching circuit is coupled to the feed point via the tunable inductor.

8. The antenna system of claim 7, wherein the tunable capacitor and the inductor are operable to alter the impedance of the matching circuit at the feed point and the impedance of the parasitic element at a parasitic-ground junction on the parasitic element based at least in part on the change in the capacitance of the tunable capacitor.

9. The antenna system of claim 7, wherein the tunable capacitor and the inductor are operable to simultaneously alter the impedance of the matching circuit and the impedance of the parasitic element based at least in part on the change in the capacitance of the tunable capacitor.

10. The antenna system of claim 7, wherein the tunable capacitor and the inductor are operable to adjust a frequency response of the antenna based at least in part on simultaneous alteration of the impedance of the matching circuit and the impedance of the parasitic element based at least in part on the change in the capacitance of the tunable capacitor.

11. The antenna system of claim 7, wherein the tunable capacitor is coupled to the matching circuit in a shunt configuration.

12. The antenna system of claim 7, wherein a first end of the transmission line is coupled to the tunable capacitor and a second end of the transmission line is coupled to the inductor at the junction of the transmission line and the parasitic element.

13. The antenna system of claim 7, wherein the antenna comprises at least one of a modal antenna or an isolated magnetic dipole antenna.

* * * * *